(12) United States Patent
Gibb et al.

(10) Patent No.: US 10,328,793 B2
(45) Date of Patent: Jun. 25, 2019

(54) METHODS AND SYSTEMS FOR COMPRESSED NATURAL GAS (CNG)

(71) Applicant: WORTHINGTON INDUSTRIES, INC., Columbus, OH (US)

(72) Inventors: Gary Gibb, Stow, OH (US); Michael Pintz, Fairview Park, OH (US); Stephen Polatas, North Canton, OH (US)

(73) Assignee: WORTHINGTON INDUSTRIES INC., Columbus, OH (US)

( * ) Notice: Subject to any disclaimer, the term of this patent is extended or adjusted under 35 U.S.C. 154(b) by 0 days.

(21) Appl. No.: 15/823,077

(22) Filed: Nov. 27, 2017

(65) Prior Publication Data

US 2018/0079298 A1 Mar. 22, 2018

Related U.S. Application Data

(63) Continuation of application No. 15/148,348, filed on May 6, 2016, now Pat. No. 9,855,841, which is a
(Continued)

(51) Int. Cl.
*B60K 15/07* (2006.01)
*B60K 15/01* (2006.01)
(Continued)

(52) U.S. Cl.
CPC ............ *B60K 15/07* (2013.01); *B60K 15/013* (2013.01); *B60K 15/03006* (2013.01);
(Continued)

(58) Field of Classification Search
CPC ................. F17C 1/00; Y10T 137/6855; Y10T 137/6881; B60K 15/03; B60K 15/063;
(Continued)

(56) References Cited

U.S. PATENT DOCUMENTS 5,529,089 A * 6/1996 Hicks ...................... F16K 1/304
137/340
6,257,360 B1 * 7/2001 Wozniak .............. B60K 15/013
180/69.5
(Continued)

OTHER PUBLICATIONS

Luis Salem, Agility Introduces All-New CNG Rail-Mounted Fuel Systems, Press Release, Mar. 22, 2012, 2 pages, Santa Ana, CA.
(Continued)

*Primary Examiner* — John D Walters
(74) *Attorney, Agent, or Firm* — Tucker Ellis LLP; Carlos Garritano

(57) ABSTRACT

Provided is a compressed natural gas (CNG) fuel system that can include a frame and at least one container. The frame can include a first side and a second side, with each side being configured to partly define a portion of an interior space. The at least one container can be configured to house or contain CNG and can be engaged to and partly encased by the frame. The at least one container can be partly located within the interior space of at least one of the first side or the second side. The frame assembly can be engaged to a chassis of a vehicle such that the at least one container is located either at least partially underneath a cab of the vehicle or at least partially behind a cab of the vehicle.

20 Claims, 32 Drawing Sheets

Related U.S. Application Data continuation of application No. 14/729,727, filed on Jun. 3, 2015, now Pat. No. 9,358,877, which is a continuation of application No. 14/085,369, filed on Nov. 20, 2013, now Pat. No. 9,086,187.

(60) Provisional application No. 61/772,829, filed on Mar. 5, 2013, provisional application No. 61/729,297, filed on Nov. 21, 2012.

(51) Int. Cl.
| | | |
|---|---|---|
| *B60K 15/03* | (2006.01) | |
| *B60R 16/08* | (2006.01) | |
| *F17C 1/00* | (2006.01) | |
| *B60K 15/077* | (2006.01) | |
| *B60K 15/063* | (2006.01) | |

(52) U.S. Cl.
CPC ............ *B60K 15/077* (2013.01); *B60R 16/08* (2013.01); *F17C 1/00* (2013.01); *B60K 2015/03019* (2013.01); *B60K 2015/03118* (2013.01); *B60K 2015/03144* (2013.01); *B60K 2015/03236* (2013.01); *B60K 2015/03309* (2013.01); *B60K 2015/03335* (2013.01); *B60K 2015/0638* (2013.01); *B60Y 2200/145* (2013.01); *B60Y 2200/148* (2013.01); *Y10T 137/6855* (2015.04); *Y10T 137/6881* (2015.04)

(58) Field of Classification Search
CPC .... B60K 15/067; B60K 15/07; B60K 15/073; B60K 15/013; B60K 15/03006; B60K 15/077; B60K 2015/03019; B60K 2015/03118; B60K 2015/03144; B60K 2015/03236; B60K 2015/03309; B60K 2015/03335; B60K 2015/0638; B60K 2015/03151; B60K 2015/03184; B60K 2015/063; B60K 2015/0636; B60R 16/08; B60Y 2200/145; B60Y 2200/148
USPC ...... 180/69.4, 69.5, 314; 280/830, 837, 831, 280/834
See application file for complete search history.

(56) References Cited

U.S. PATENT DOCUMENTS

| | | | | |
|---|---|---|---|---|
| 6,502,660 | B1 * | 1/2003 | Scott .................... | B60K 15/013 137/267 |
| 6,676,163 | B2 * | 1/2004 | Joitescu ................ | B60K 15/07 280/834 |
| 7,882,587 | B2 * | 2/2011 | Tagliaferri ........... | B60K 15/063 15/340.1 |
| 8,534,403 | B2 * | 9/2013 | Pursifull ................ | B60K 15/07 180/314 |
| 8,991,423 | B2 * | 3/2015 | Matsukawa ........ | F02M 37/0023 123/1 A |
| 2011/0288738 | A1 * | 11/2011 | Donnelly ............ | F02D 19/0697 701/99 |

OTHER PUBLICATIONS

Luis Salem, Agility Launches an All-New CNG Product, Offering the Most Space Efficient Natural Gas Fuel System in the Market, Press Release, Jun. 24, 2013, 2 pages, Santa Ana, CA.
Showtimes—Alternative Fuels & Vehicles National Conference & Expo; Monday, Apr. 2, 2007; 19 pages.
Showtimes—Alternative Fuels & Vehicles National Conference & Expo; Tuesday, Apr. 3, 2007; 19 pages.
Journal of Innovative Management; vol. 9, No. 3; Spring 2004; 68 pages.

* cited by examiner

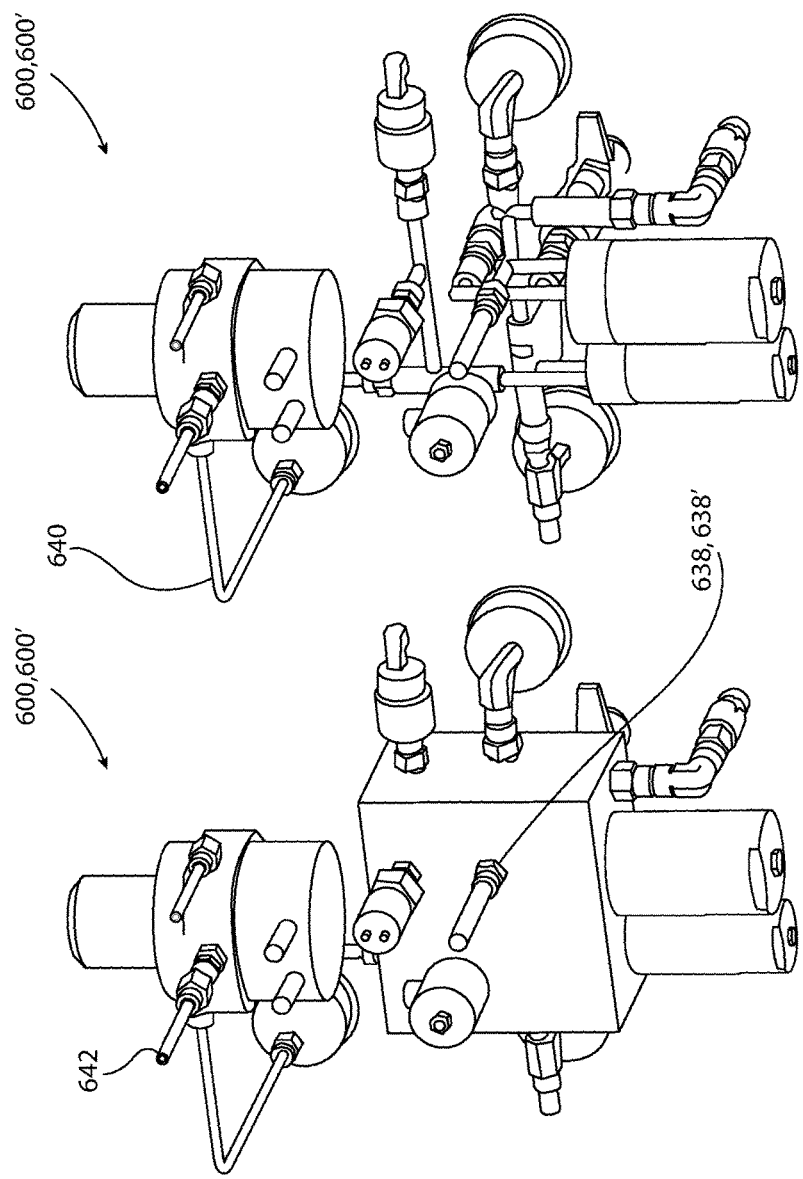

METHODS AND SYSTEMS FOR COMPRESSED NATURAL GAS (CNG)

CROSS-REFERENCE TO RELATED APPLICATIONS

This application is a continuation of U.S. Non-provisional application Ser. No. 15/148,348, filed May 6, 2016 and entitled "METHODS AND SYSTEMS FOR COMPRESSED NATURAL GAS (CNG)." application Ser. No. 15/148,348 is a continuation of and claims the benefit of U.S. Non-provisional application Ser. No. 14/729,727, filed Jun. 3, 2015 and entitled "METHODS AND SYSTEMS FOR COMPRESSED NATURAL GAS (CNG)." application Ser. No. 14/729,727 is a continuation of and claims the benefit of U.S. Non-provisional application Ser. No. 14/085,369, filed Nov. 20, 2013 and entitled "METHODS AND SYSTEMS FOR COMPRESSED NATURAL GAS (CNG)." application Ser. No. 14/085,369 is a non-provisional of and claims the benefit of U.S. Provisional Application Ser. No. 61/729,297, filed Nov. 21, 2012 and U.S. Provisional Application Ser. No. 61/772,829, filed Mar. 5, 2013. The entireties of the aforementioned applications are incorporated herein by reference.

BACKGROUND

Technical Field

Embodiments of the subject matter disclosed herein relate to utilizing compressed natural gas as a fuel source. Some embodiment are directed to utilizing compressed natural gas as a fuel source for a vehicle.

DISCUSSION OF ART

It may be desirable to have a compressed natural gas (CNG) system and method that differs from those systems and methods that are currently available.

BRIEF DESCRIPTION

In an embodiment, a frame assembly for a compressed natural gas fuel system intended to fuel a vehicle engine is provided. The frame assembly can include: a first side and a second side, each side configured to partly define an interior space; a connecting member engaged between the first side and the second side; at least one container supported by and partly located within the interior space of at least one of the first side or the second side, wherein the at least one container is configured to house compressed natural gas; the frame assembly configured to be engaged to a chassis of a vehicle at a location on the chassis that is located rearward of a cab of the vehicle; and a manifold located on at least one of a driver side of the vehicle or a passenger side of the vehicle, the manifold is in fluid communication with at least one of the vehicle engine or the at least one container.

In an embodiment, a frame assembly for a compressed natural gas fuel system intended to fuel a vehicle engine is provided. The frame assembly can include: a first side and a second side, each side configured to partly define an interior space; a connecting member engaged between the first side and the second side; at least one container supported by and partly located within the interior space of at least one of the first side or the second side, wherein the at least one container is configured to house compressed natural gas; the frame assembly configured to be engaged to a chassis of a vehicle at a location on the chassis that is located below the cab of the vehicle; and a manifold located on at least one of the first side or the second side, the manifold is in fluid communication with at least one of the vehicle engine or the at least one container.

In an embodiment, a frame assembly for a compressed natural gas fuel system intended to fuel a vehicle engine is provided. The frame assembly can include: a first side and a second side, each side configured to partly define an interior space; a connecting member engaged between the first side and the second side; at least one container supported by and partly located within the interior space of at least one of the first side or the second side, wherein the at least one container is configured to house compressed natural gas; the frame assembly configured to be engaged to a chassis of a vehicle at a location on the chassis that is located rearward of a cab of the vehicle or below the cab of the vehicle; and at least one fuel module integrated within the frame assembly.

BRIEF DESCRIPTION OF THE DRAWINGS

Reference is made to the accompanying drawings in which particular embodiments and further benefits of the provided subject matter are illustrated as described in more detail in the description below.

FIG. 18A is a rear illustration of the embodiments of a fuel module shown in FIG. 13A and FIG. 13B.

FIG. 18B is a rear illustration of the embodiments of a fuel module shown in FIG. 13A and FIG. 13B.

DETAILED DESCRIPTION

Figure 1:
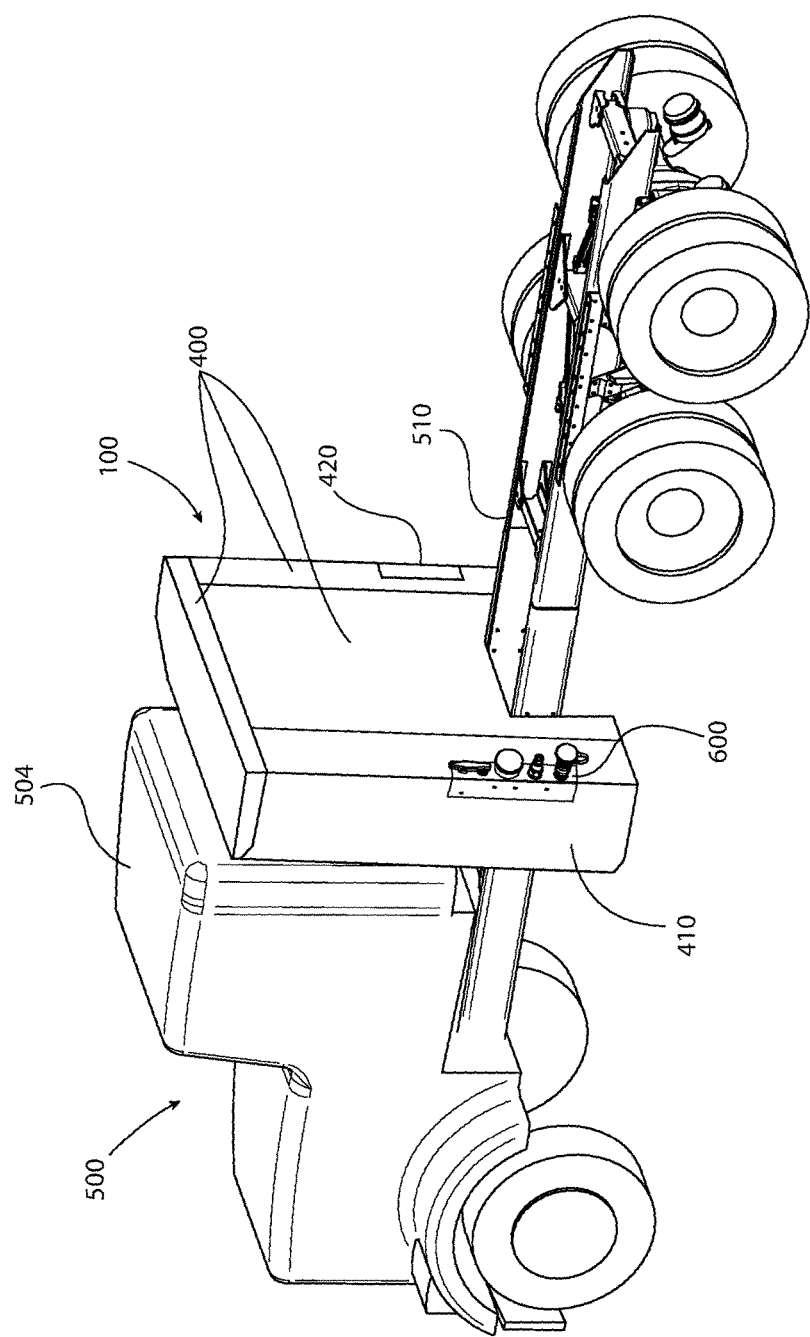
FIG. 1 is an illustration of a first embodiment of a compressed natural gas (CNG) system engaged with an associated vehicle in a vertical orientation.
Figure 2:
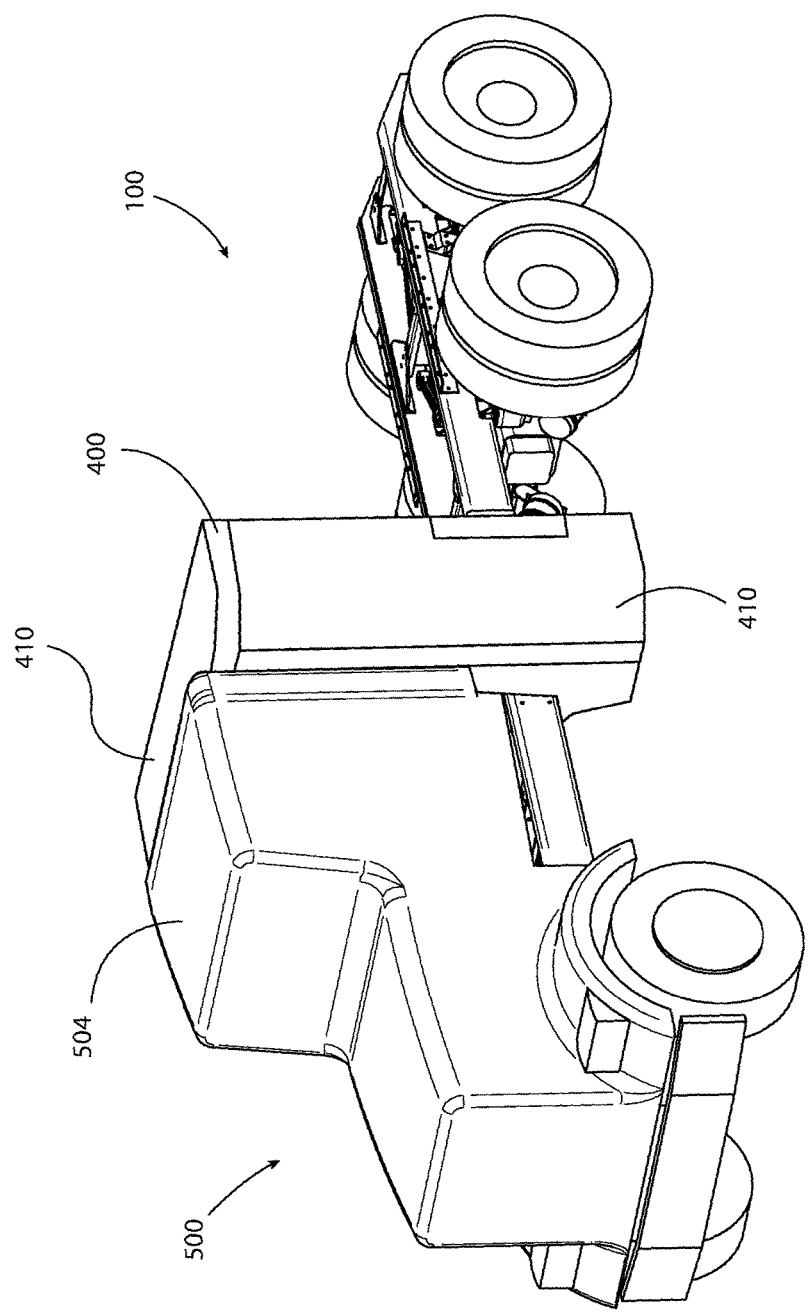
FIG. 2 is an illustration of the embodiment of FIG. 1 of a compressed natural gas (CNG) system engaged with an associated vehicle in a vertical orientation.
Figure 3:
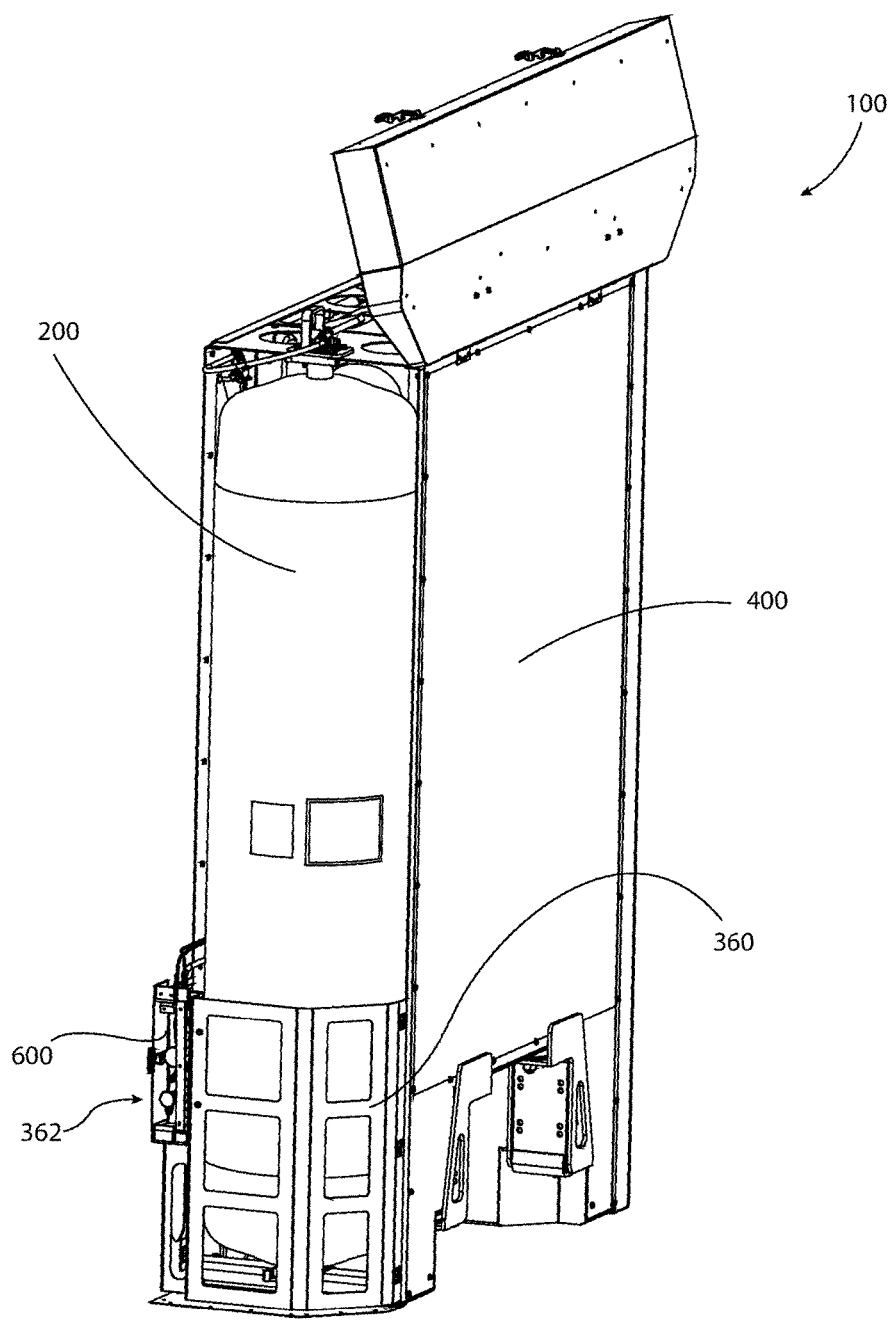
FIG. 3 is an illustration of the embodiment of the compressed natural gas (CNG) system engaged of FIG. 1 with part of the casing removed.
Figure 4:
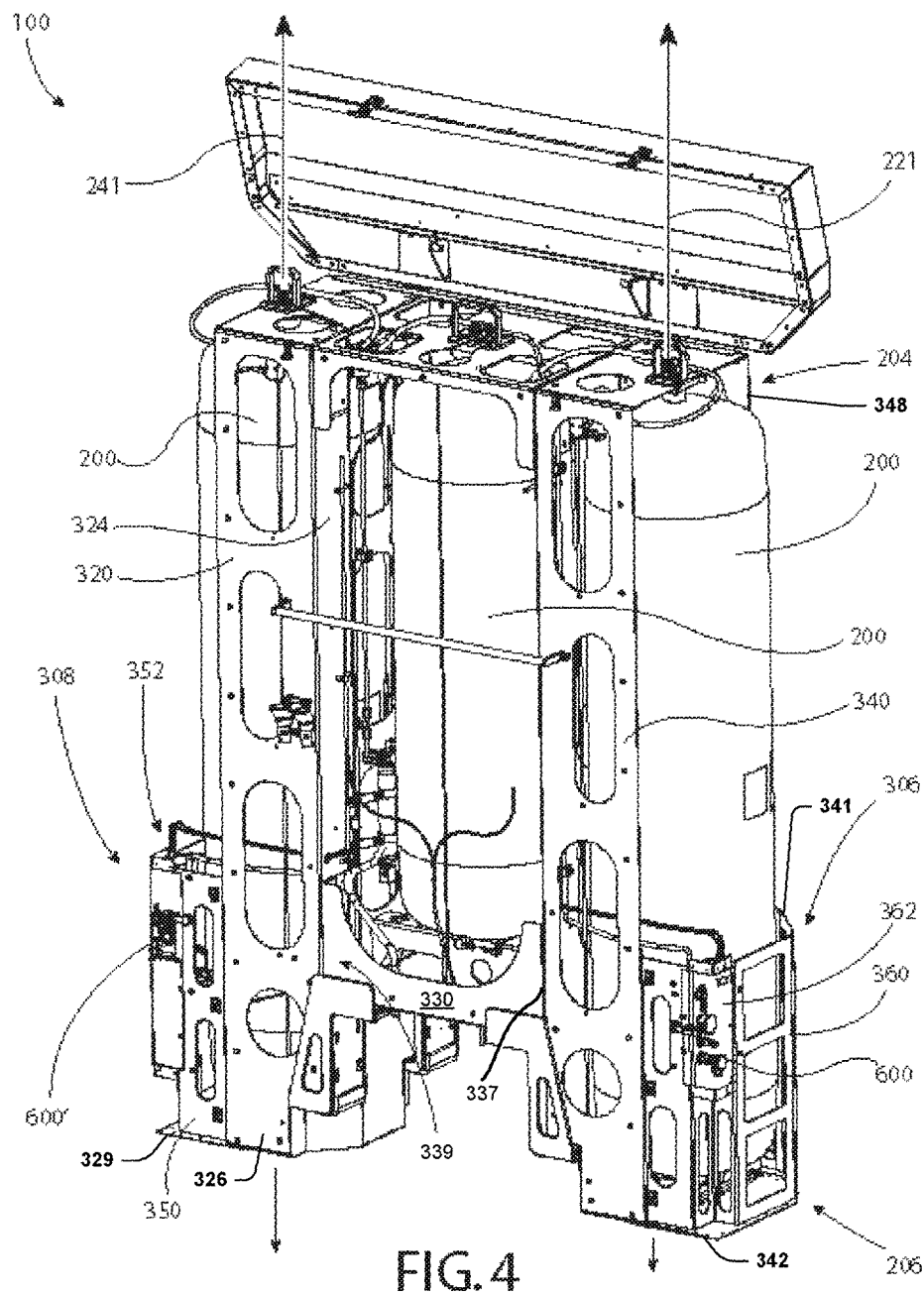
FIG. 4 is an illustration of the embodiment of the compressed natural gas (CNG) system engaged of FIG. 1 with part of the casing removed.
Figure 5:
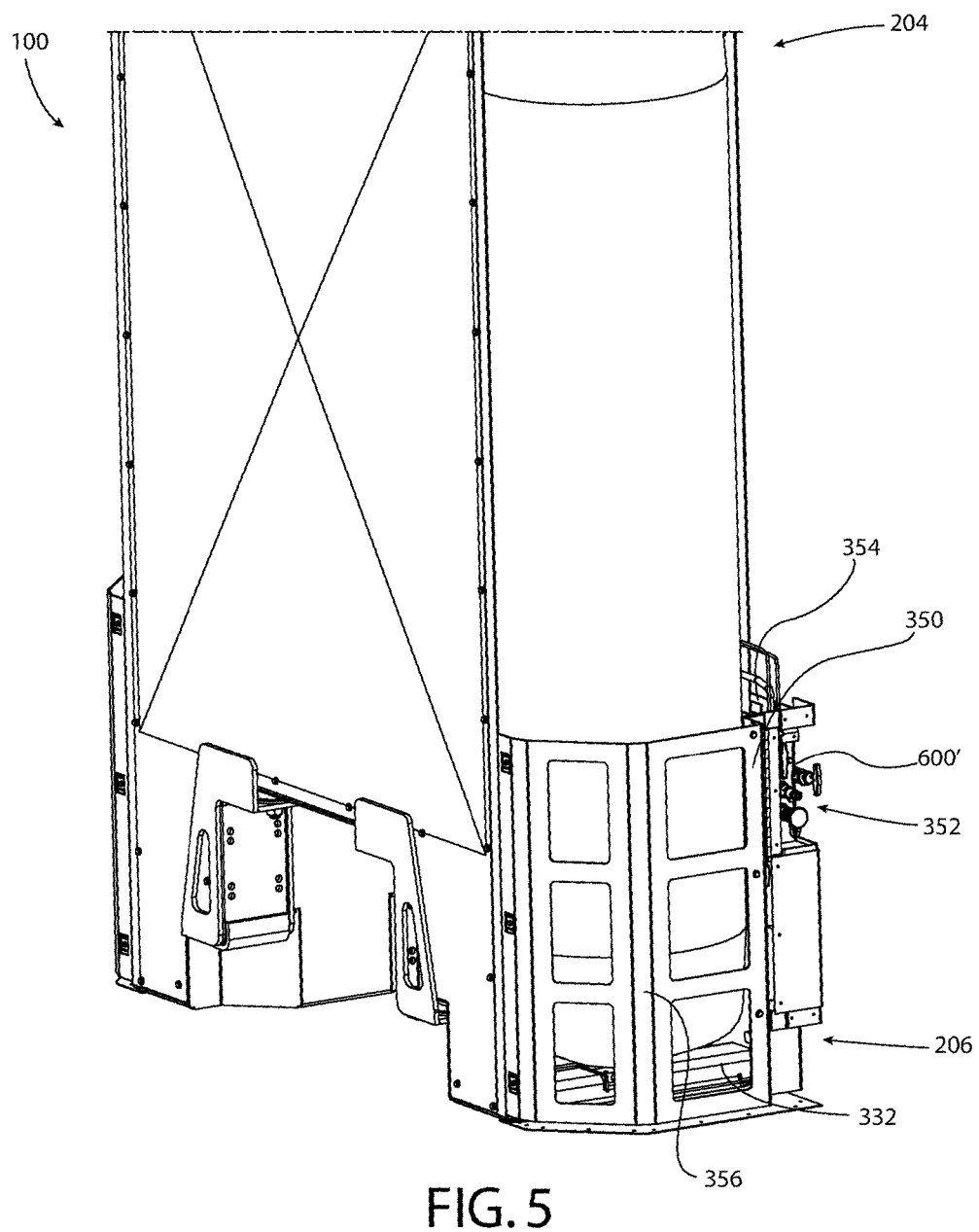
FIG. 5 is an illustration of the embodiment of the compressed natural gas (CNG) system engaged of FIG. 1 with part of the casing removed.

Embodiments of the provided subject matter relate to methods and systems for utilizing compressed natural gas as a fuel source for a vehicle. A compressed natural gas (CNG) system can include a one or more containers that house a portion of compressed natural gas (CNG). The one or more containers can be vertically or horizontally oriented with connective means behind a driver cabin of the vehicle or underneath a portion of a cabin of the vehicle, or to one or both of the sides of the vehicle such that the one or more containers are unrestricted to designs of vehicles as well as vehicle performance (e.g., aerodynamics, towing capacity, hitching techniques, among others), wherein the connective means allow for container expansion and contraction with the use of a rail connection system.

A first container can be located on a driver-side of a frame of the vehicle and attached thereto whereas a second container can be located on a passenger-side of the frame of the vehicle and attached thereto. Such attachment can be a saddling of the frame with a container on each side. The one or more containers can reside in a plane that is in a linear orientation and located in a substantially similar plane as at least one of an axle of the vehicle or the frame of the vehicle. In one embodiment, the first container and, optionally, the second container may be horizontally positioned in a plane that is substantially similar to a frame of the vehicle or at least one axle of the vehicle. Furthermore, the one or more containers may be parallel to a ground to which the vehicle travels or drives on. In another embodiment, the first container and, optionally, the second container may be vertically positioned in a plane behind the cabin of the vehicle perpendicular to a ground to which the vehicle travels or drives on.

In another embodiment, a manifold system (also referred to as a fuel module system) is employed with the systems 100 and 102 that includes a driver side manifold and a passenger side manifold. The manifolds (e.g., the passenger side manifold and driver side manifold) each include respective elements such as, but not limited to, a fill port, a fast-fill port, a transfer valve, a fuel transfer port, among others. Each manifold can further include shut-off valves, internal check valves, inlet fittings, fuel storage fittings, coalescing filter, pressure gage, and the like.

In another embodiment, a communications component is utilized with a system 100 and/or 102 that provides at least one of user interaction with a system 100 and/or 102 and/or diagnostic information related to the system 100 and/or 102. Additionally, the communications component can provide a display for a back-up camera on the vehicle and/or trailer. The communications component can be physically located inside the vehicle to provide information such as, but not limited to, one or more container pressure, temperature of one or more containers, real time information related to the system, temperature compensation fuel gauge, among others. The communications component may comprise a gauge, a lamp, a light, an LED, a series of lights or LEDs, a CRT, a plasma display, a liquid crystal display, or other data output device chosen with good engineering judgment.

In an embodiment, a system 100 and/or 102 can leverage at least one Radio Frequency Identification (RFID) tag associated with one or more components (e.g., container, regulator, manifold, fuel line, hose, among others) in which an RFID reader can collect information from the RFID tag in order to verify information associated with the system 100 and/or 102 (e.g., manufacture date, quality control (QC) inspection, shipping date, installation date, installer, critical service dates, historic data, service dates, among others). For instance, RFID tags can be written with identifying data, wherein an RFID reader can receive this identifying data for verification related to safety, tracking, monitoring, quality control, among others. In another embodiment, an RFID component is utilized to scan and program RFID tags with identifying data in which the RFID component utilizes one or more databases to track identifying data to particular elements or components.

In an embodiment, the cellular multi-protocol RFID reader combines unsurpassed read/write reliability and performance in difficult to read environments with GSM cellular and GPS connectivity for easy deployments at remote or mobile worksites. The reader's advanced design provides backward compatibility with EPCglobal C1G2 (GEN2) certified tags with the maximum allowed 1 watt transmit power, and more than 10× range extension to greater than 100 meters using the Battery Assisted Passive RFID (BAP) protocol extensions in the ISO/IEC 18000-6:2010 standard. The self contained units can be directly integrated and powered from the installation machine's power source—providing a true mobile solution. This will provide accurate Locating and Asset Management/Tracking of the subject innovation enabled product lines.

In an embodiment, the system 100 and/or 102 can couple RFID technology with Global Positioning Service (GPS). This coupling can enable operators and/or fleet managers to access location information such as, but not limited to, refueling locations, service center locations, route tracking, among others. In an embodiment, the system 100 and/or 102 can include a settings component that is configured to provide one or more settings or configurations based on particular events, conditions, locations, and the like. For instance, the settings component can utilize a weather setting in which the system 100 and/or 102 performance is modified to account for extreme weather conditions (e.g., hot, cold, dry, high humidity, among others).

In an embodiment, the system 100 and/or 102 is adapted to integrate with a vehicle. For instance, the system 100 and/or 102 can include a particular design to match with a design of a vehicle to which the CNG system is used. This latter design may include a particular shape, style, look, feel, color, trade dress, brand indicia, or other factors. As described in more detail below, the system 100 and/or 102 can be attached to a frame of a vehicle behind a cabin location with one or more containers in a vertical orientation or underneath a portion of a cabin and along a side of the vehicle or at some other orientation or position. The system 100 and/or 102 can be in a "skin" or housing in which the housing may be metal, metal alloy, composite material, fiberglass, or other material chosen with good engineering judgment and can include a matching style of a design of the cabin and/or overall vehicle. In general, the system 100 and/or 102 can be integrated behind the cabin of the vehicle or underneath a portion of a cabin and along a side of the vehicle or at some other orientation or position such that the system 100 and/or 102 blends with and matches the design of the vehicle.

In an embodiment, the system 100 and/or 102 includes features that enhance interoperability to a vehicle. For instance, the system 100 and/or 102 can include O-ring face seal connections (ORC) which eliminate metal-to-metal seals and concerns related to torque and assembly time. ORC decrease assembly time based on reliance on compression of an elastomer O-ring while providing leak resistant connections. In another example, a manifold block may eliminate or reduce the need for rigid tubing and may provide for efficient fuel flow without reduction in pressure while also reducing potential number of leak points. The system 100 and/or 102 can implement one or more torque bolt locks 304 (e.g., also referred to as a Huck lock bolt) to prevent loss of clamping force often experienced using fastening hardware. In an embodiment, a torque bolt 304 (also referred to as Huck bolts) may be used in many applications to prevent loss of clamping force often experienced using fastening hardware.

In an embodiment, the system 100 and/or 102 employs various safety features. For instance, one or more electric solenoids can be employed in which one or more valves for the one or more containers in the system 100 and/or 102 can be automatically controlled via electric solenoid valves. For instance, in a case of an emergency and manual operation of control valves is unavailable, an electric solenoid valve can provide automatic control (e.g., open, close, etc.) to the one or more containers. In certain embodiments, one or more automatically controlled electric solenoid valves may be arranged in series with one or more manual valves in order to create a valve set in which closure of an automatically controlled electric solenoid valves is sufficient to shut off flow and opening of all the automatically controlled electric solenoid valves in the valve set is necessary to permit flow.

In an embodiment, the system 100 and/or 102 is assembly line ready and configurable to a vehicle. The system 100 and/or 102 can be a self-contained system that attaches to a portion of a vehicle. In particular, the attachment can be with shock mounts to a frame of the vehicle behind a cabin or to a frame of the vehicle on one or both sides of the vehicle. Attachment to a frame of the vehicle on one or both sides of the vehicle may be with components on one or both sides of the vehicle frame under a portion of a cab of the vehicle. This latter attachment can saddle each side of a frame of the vehicle or can be placed to one side or the other of the vehicle along the frame. Upon attachment to the vehicle, the system 100 and/or 102 can be communicatively coupled to the vehicle via an electric connection and/or a fuel line connection. In another embodiment, the system 100 and/or 102 can include a powder coated exterior adapted to match the style existent on a chosen vehicle. A powder coated exterior may also increase durability. In another embodiment, the system 100 and/or 102 can include one or more components or features fabricated from a composite material, such as, without limitation, fiberglass. Composite materials may be selected to provide desired strength, toughness, and weight.

In an embodiment, the system 100 and/or 102 can include a temperature sensitive component operatively engaged with a valve for the one or more containers. In some non-limiting embodiments, the temperature sensitive component can be proximate to the one or more containers and may include a wire component encased within a cylinder tubing, wherein the wire component is coupled to a valve for each of the one or more containers. The wire component of the temperature sensitive component disconnects to open the valve at a temperature to release contents of the one or more containers.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, and the like. The term "container" as used herein can be defined as any cylinder, tank, housing, canister, and the like of any suitable material that can house or contain a portion of compressed natural gas.

FIGS. 1-9 illustrate one non-limiting embodiment of a system 100 that includes one or more containers 200 configured in a vertical orientation. The system 100 is a non-limiting embodiment that includes one or more containers 200 that are configured to house a portion of compressed natural gas (CNG), each container 200 may be cylindrical in shape with a length, a diameter, and a first end 204 opposite a second end 206 in which the first end includes a valve opening 212; a frame 300 that encases at least the one or more containers 200; a casing 400 that surrounds the frame 300 and the one or more containers 200; the length of the one or more containers 200 are oriented in a vertical position; the frame 300 is adapted to attach to a portion of a chassis 510 of a vehicle 500, wherein the frame 300, the casing 400, and the one or more containers 200 are located behind a cabin 504 of the vehicle 500; and the one or more containers 200 are connected to the frame 300 with a first neck mount 322 for the first end 204 of each of the one or more containers 200 and a second neck mount 332 for the second end 206 of each of the one or more containers 200.

It should be understood that in other acceptable embodiments the orientation of the one or more containers 200 need not be vertical; the containers 200 may be horizontal in a system 102, as shown in FIGS. 10-11 and 22-29, or in some other orientation such as, without limitation, slanted. As shown in FIGS. 10-11 and 22-29, in non-limiting system embodiment 102 the one or more containers 200 may be placed underneath a portion of cabin 504 and along a side, such as without limitation, the driver-side 506 or the passenger side 508, of the vehicle 500. It should be understood that in the non-limiting system embodiment 102 shown in FIGS. 10-11 and 22-29, the one or more containers 200 may be placed on either side of the vehicle 500 close to, within or partially within, the location that fuel tanks typically occupy. For instance, the system 102 can be used in combination with one or more fuel tanks or in replacement of one or more fuel tanks. In embodiments with multiple containers 200, the containers 200 may have orientations that differ from one another. In embodiments with a single container 200, the container 200 may be horizontal vertical or slanted and may be positioned at either side of the vehicle 500, upright, mounted along the chassis 510 of the vehicle 500 on either side, or mounted horizontally and transverse to the chassis 510.

In another embodiment, the system 102 can include one or more containers 200, wherein the one or more containers 200 are oriented in a vertical position, a horizontal position, or a combination thereof. In a non-limiting example, a vehicle 500 can include a first container 200 oriented in a horizontal mounting configuration on one of a driver side or a passenger side of a vehicle 500. In this non-limiting example, the vehicle 500 can further include a second container 200 oriented in a vertical mounting configuration. It is to be appreciated that any variation of number of container 200 and manner to which they are oriented, vertical, horizontal, or otherwise, are to be seen as details that can be chosen with sound engineering judgment without departing from the scope of the subject disclosure. In general, and unless otherwise noted, all of the subject matter herein can be applied equally well to embodiments having any number of containers 200. In general, and unless otherwise noted, all of the subject matter herein can be applied equally well to embodiments having containers 200 having any orientation, vertical, horizontal, or otherwise.

As shown in FIGS. 4-9, 11, 23, and 27, in systems 100 and 102 containers 200 may be neck mounted, that is mounted at one or more neck 210 of the container 200. It is to be appreciated that the container 200 can include a neck on at least one end of the container 200. A neck mount provides for substantially stress free container expansion and/or contraction. A neck mount (referred to as neck mount 332 and 322 and illustrated in FIGS. 5, 6, and 8) may comprise a mounting block 214 having an internal geometry 215 adapted to engage with the neck 210 of a container 200 and an external geometry 216 (shown in FIG. 7) adapted to engage with a block receiver 218 in frame 300. In the non-limiting embodiment shown in FIG. 7, the neck 210 of container 200 is substantially cylindrical, the internal geometry 215 of mounting block 214 is a substantially cylindrical hollow adapted to receive and closely conform to the neck 210 of container 200, the external geometry 216 of mounting block 214 is substantially cuboid, and block receiver 218 is a hollow having an interior adapted to receive and closely conform to the cuboid substantially external geometry 216 of mounting block 214. It should be understood that the internal geometry 215 of the mounting block can be adapted to accept a wide variety of shapes of a neck 210 including, but not limited to, cylindrical, cuboid, prismatic, polyhedral, or otherwise. It should be understood that the external geometry 216 of the mounting block and the block receiver 218 can be any of a wide variety of shapes including, but not limited to, cylindrical, prismatic, or otherwise. It should be understood that the fit between the neck 210 of container 200 and the internal geometry 215 of mounting block 214 may be a tight fit or press fit or other fit adapted to prevent slippage between the neck 210 and the internal geometry 215, or may be a loose or clearance or other fit adapted to permit slippage between the neck 210 and the internal geometry 215. It is further to be appreciated that a neck mount can be used on each end of the container 200 for each container 200 used in system 100 and/or system 102.

In an embodiment, the system 100 and/or 102 can store information with a data store (not shown). It is to be appreciated that the data store can be, for example, either volatile memory or nonvolatile memory, or can include both volatile and nonvolatile memory. The data store of the subject systems and methods is intended to comprise, without being limited to, these and other suitable types of memory. In addition, it is to be appreciated that the data store can be a server, a database, a hard drive, a flash drive, an external hard drive, a portable hard drive, a cloud-based storage, a solid state drive, and the like.

The aforementioned systems, components, (e.g., system 100 and/or 102, manifold 600 and/or 600', fuel interface module, communications component, settings component, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 12:
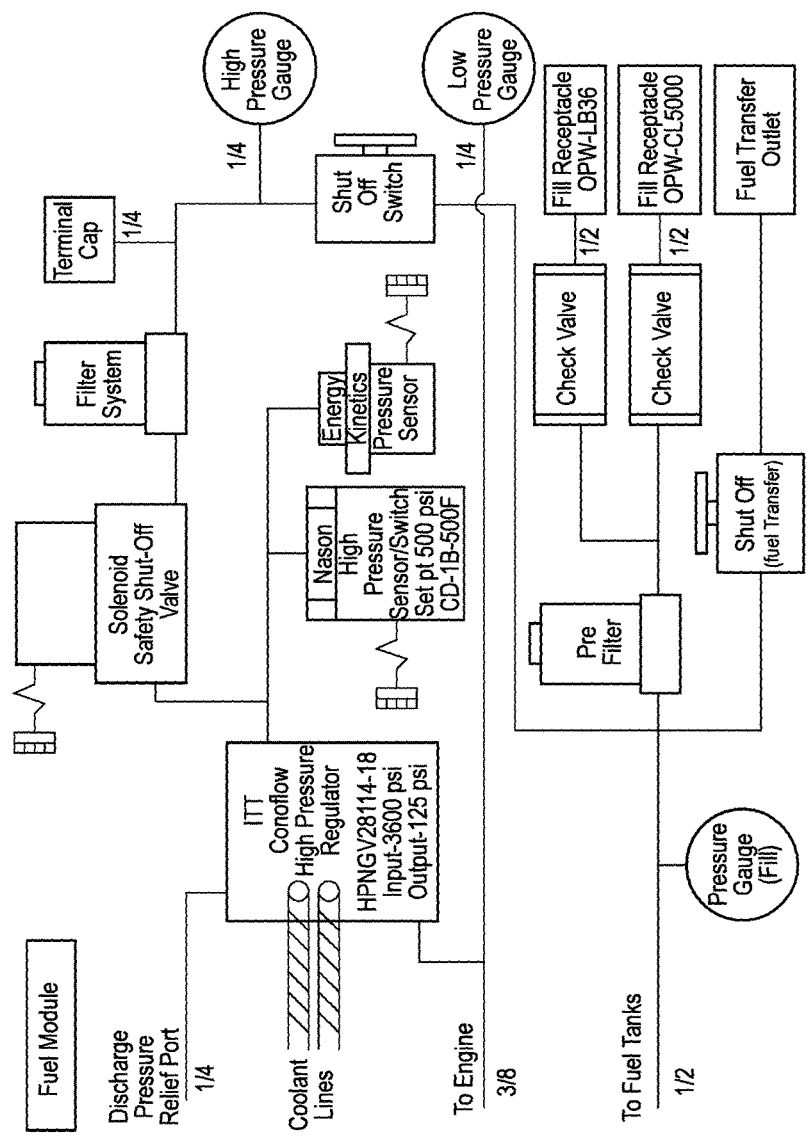
FIG. 12 is a schematic illustration of an embodiment of a fuel module.
Figure 13:
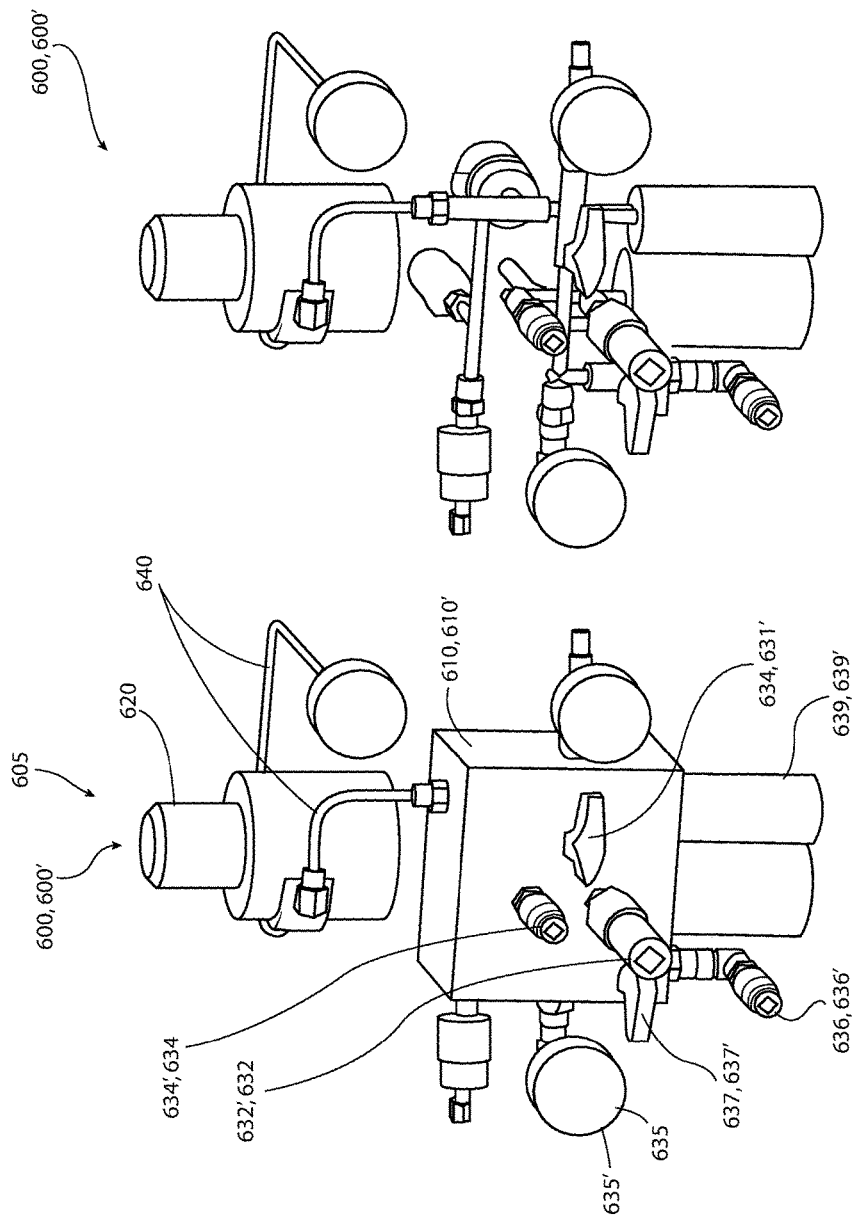
FIG. 13A is an illustration of embodiments of a fuel module.
FIG. 13B is an illustration of embodiments of a fuel module.
Figure 14:
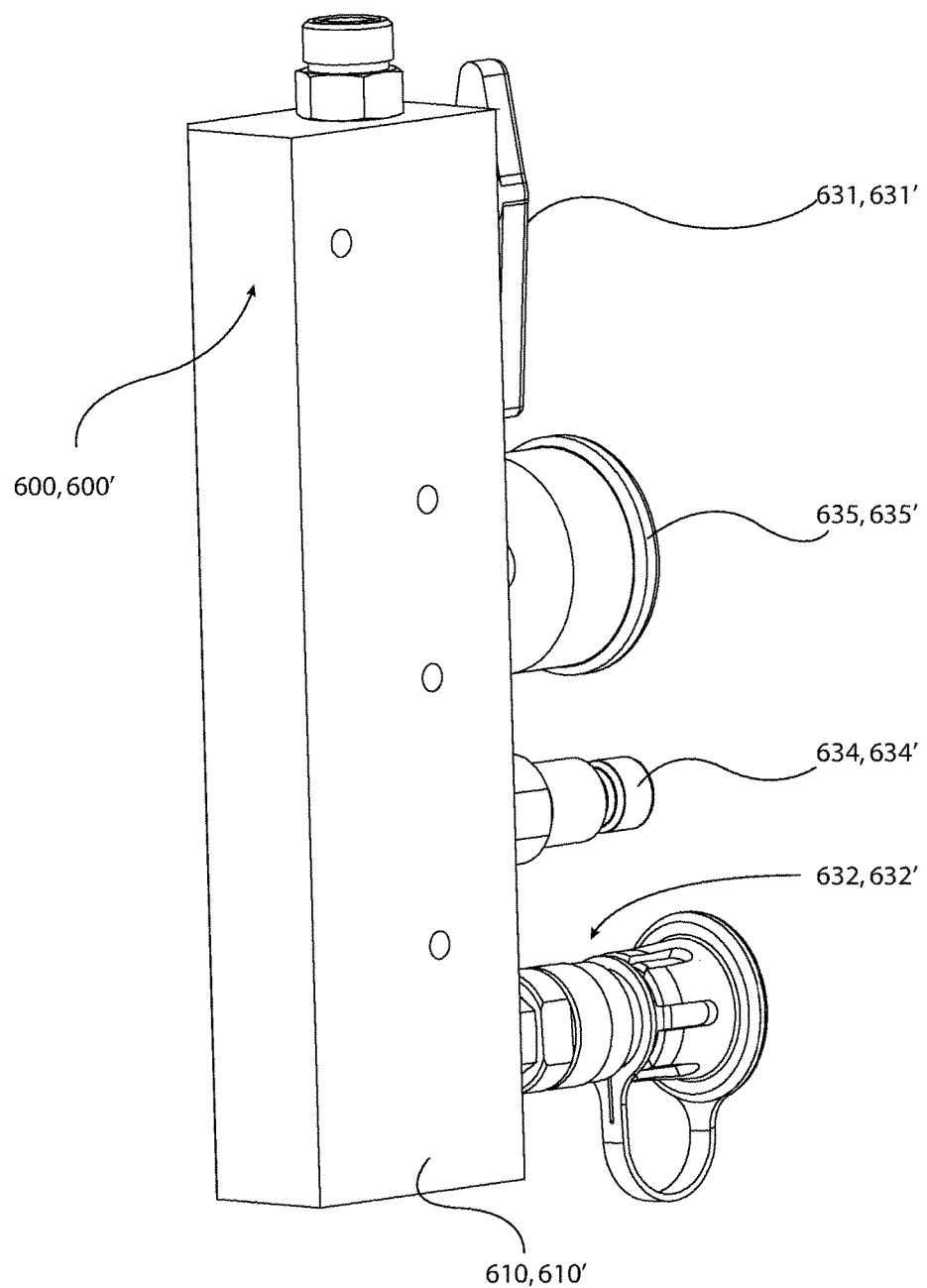
FIG. 14 is an illustration of an embodiment of a fuel module.
Figure 15:
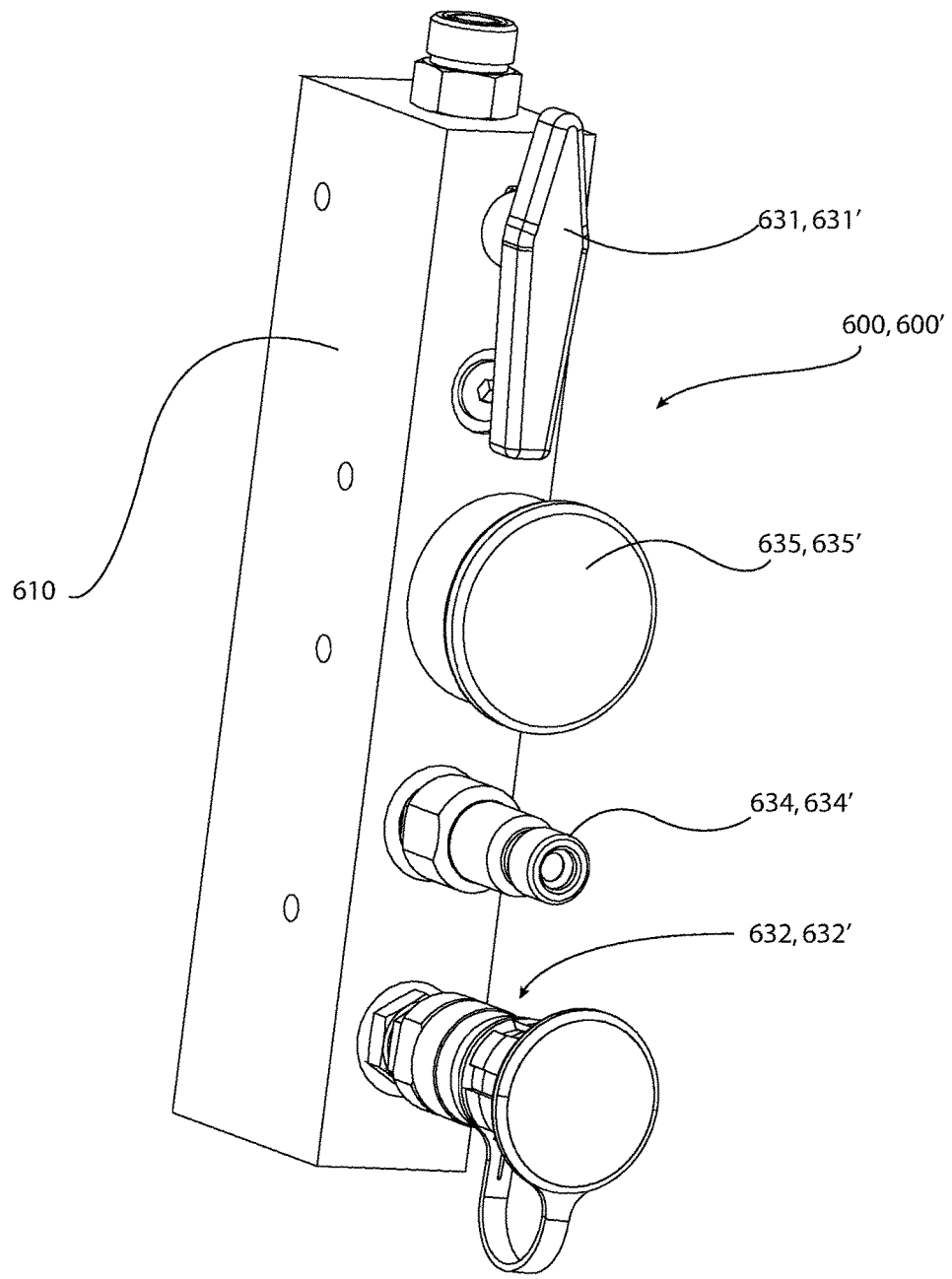
FIG. 15 is an illustration of an embodiment of a fuel module.
Figure 16:
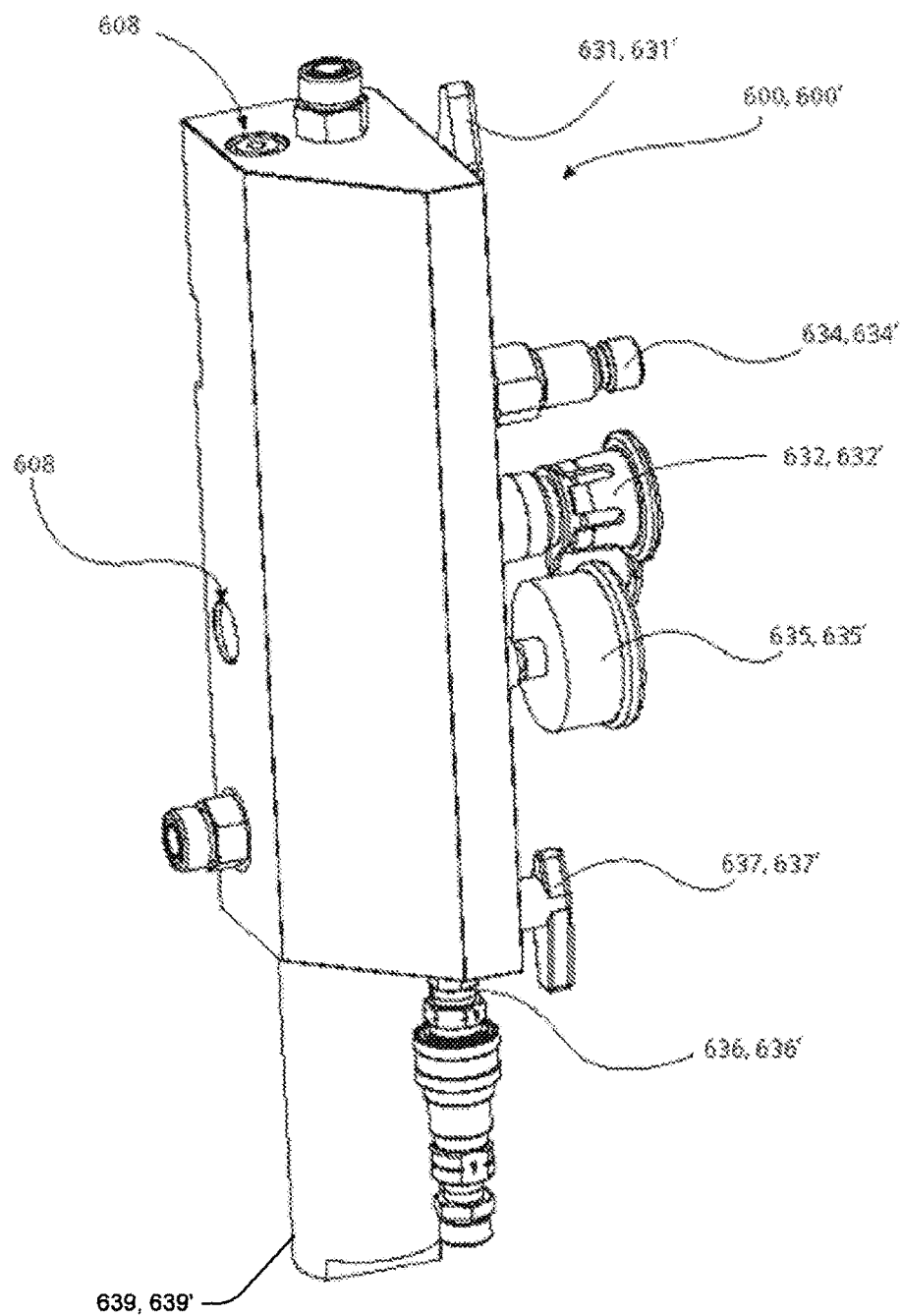
FIG. 16 is an illustration of an embodiment of a fuel module.
Figure 17:
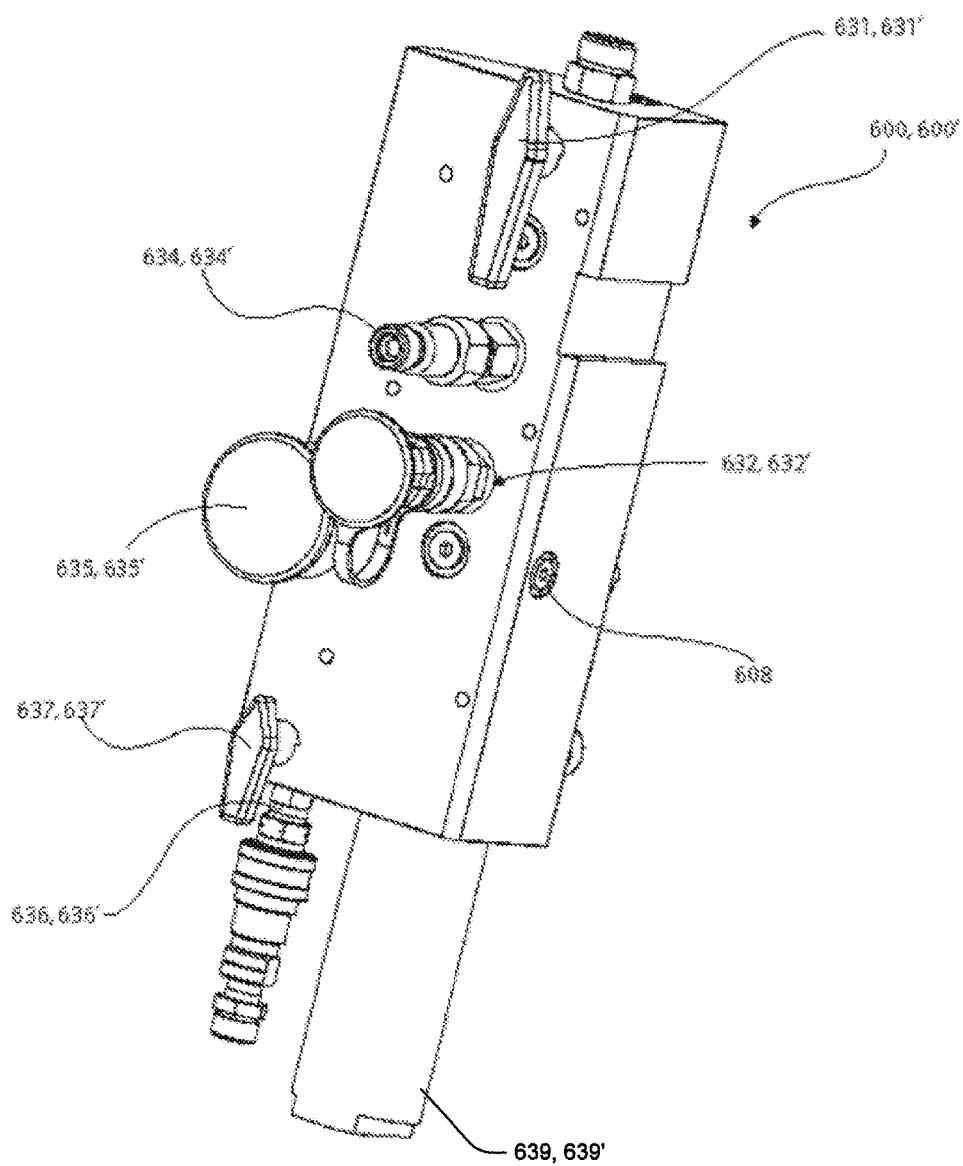
FIG. 17 is an illustration of an embodiment of a fuel module.
Figure 19A:
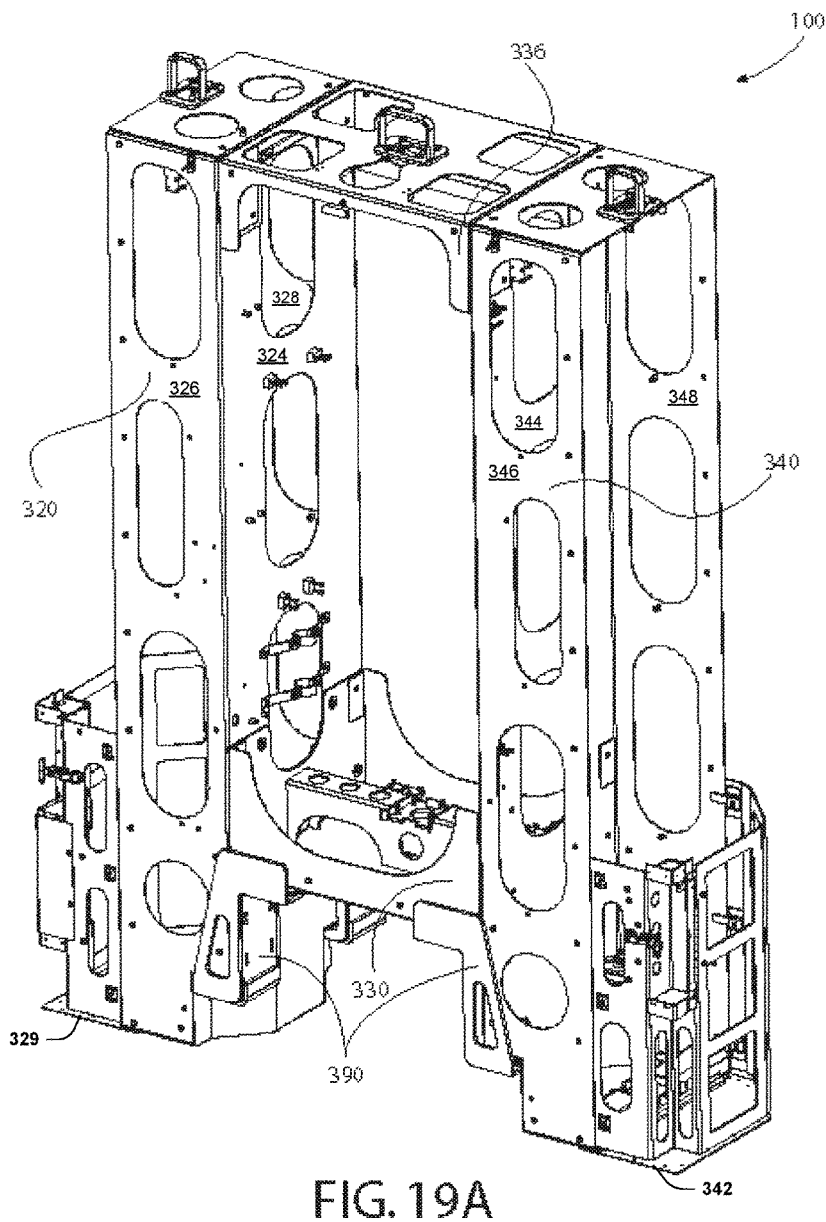
FIG. 19a is an illustration of one embodiment of a frame for a vertical oriented system shown in a front perspective view.
Figure 19B:
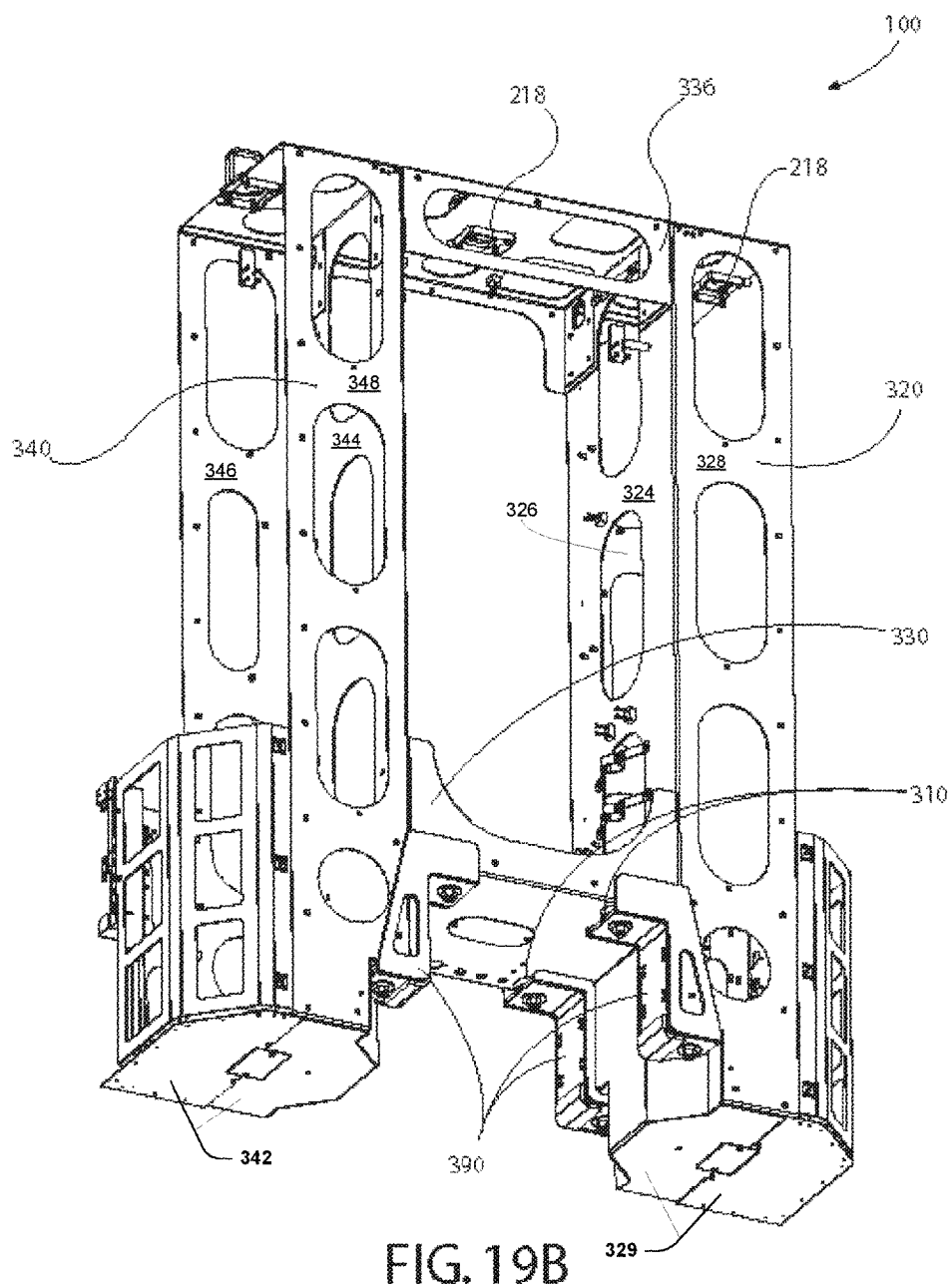
FIG. 19b is an illustration of one embodiment of a frame for a vertical oriented system shown in a rear perspective view.
Figure 19C:
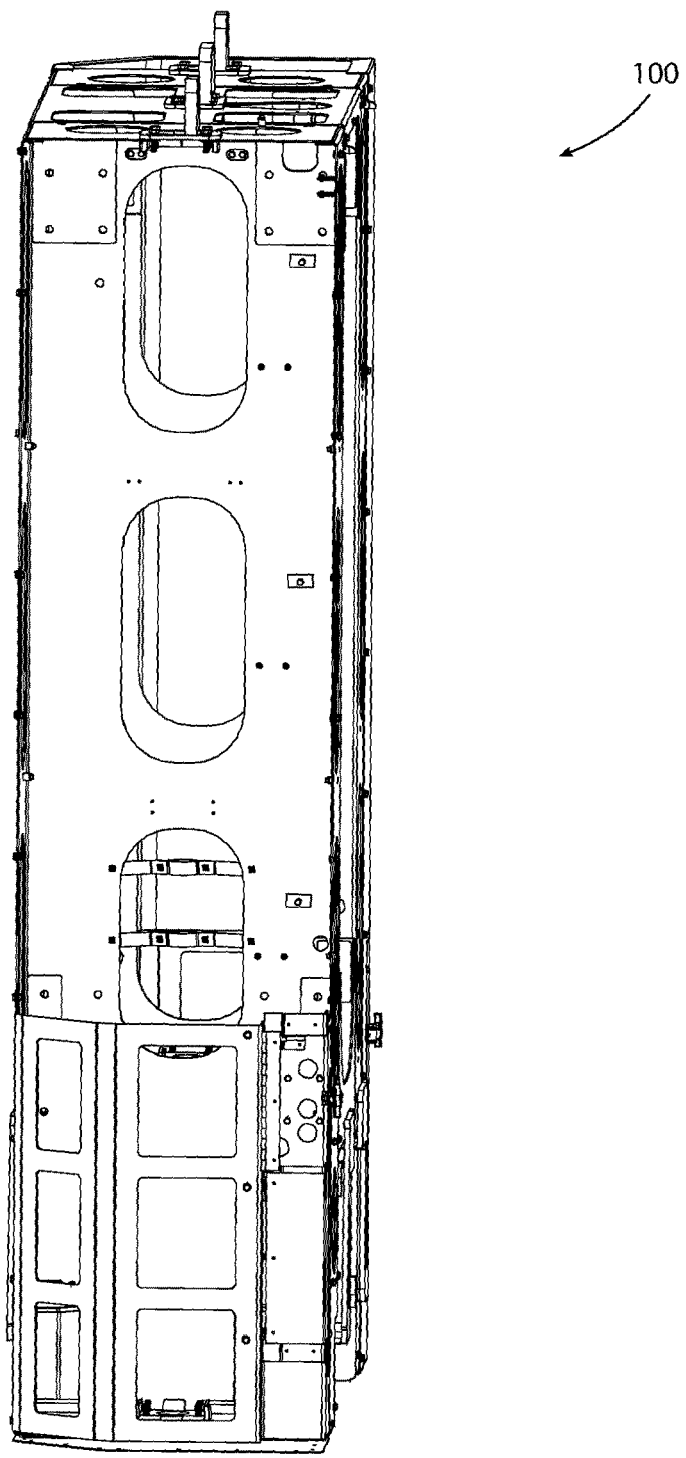
FIG. 19c is an illustration of one embodiment of a frame for a vertical oriented system shown in a side perspective view.
Figure 19D:
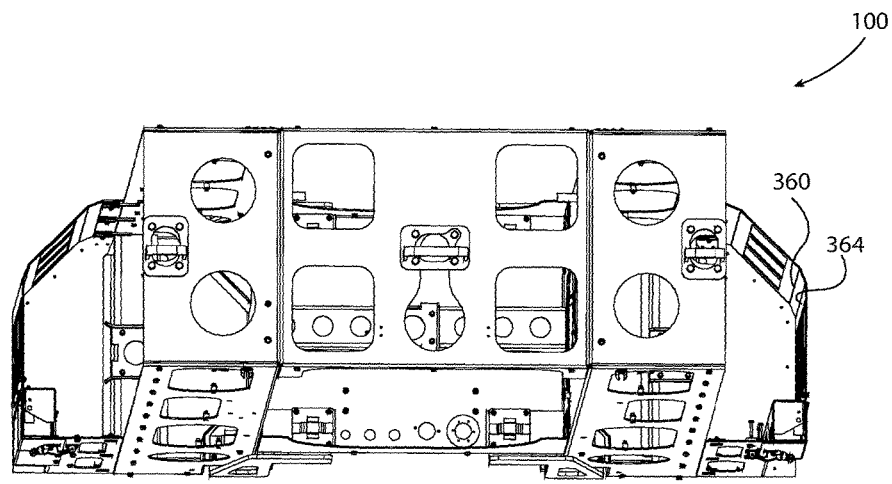
FIG. 19d is an illustration of one embodiment of a frame for a vertical oriented system shown in a top perspective view.
Figure 19E:
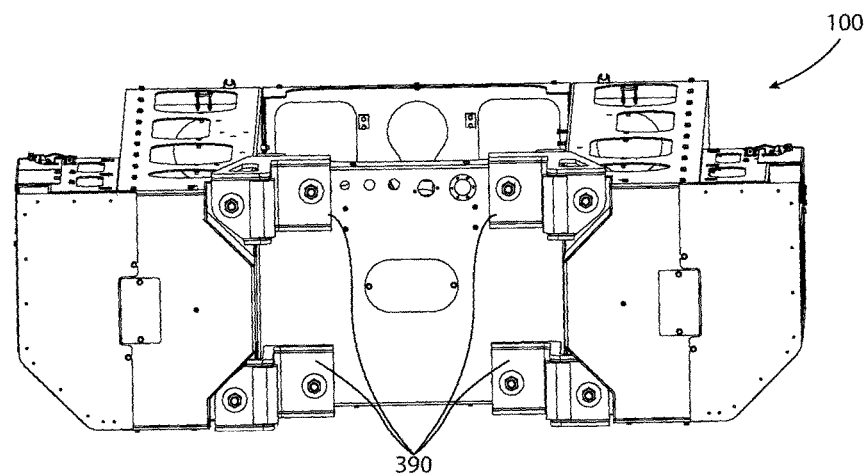
FIG. 19e is an illustration of one embodiment of a frame for a vertical oriented system shown in a bottom perspective view.
Figure 20A:
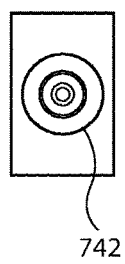
FIG. 20A is an illustration of one embodiment of a pressure relief device.
Figure 20B:
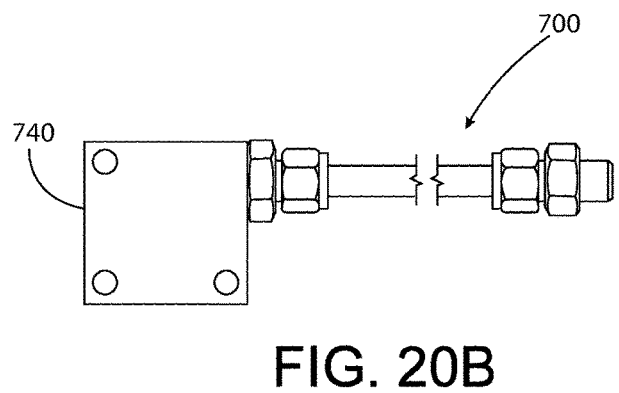
FIG. 20B is an illustration of one embodiment of a pressure relief device.
Figure 20C:
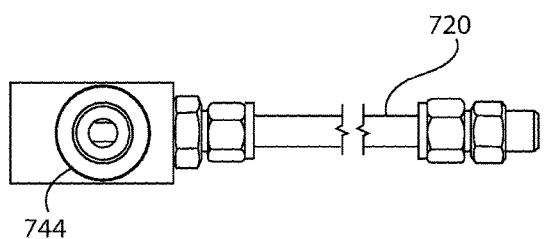
FIG. 20C is an illustration of one embodiment of a pressure relief device.
Figure 20D:
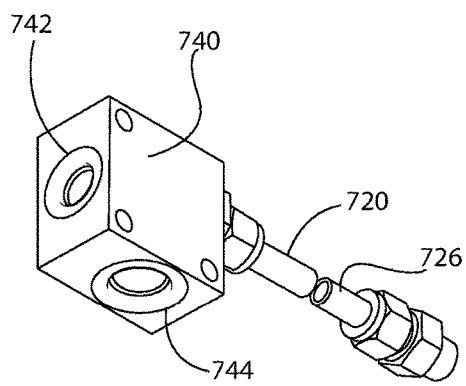
FIG. 20D is an illustration of one embodiment of a pressure relief device.

In view of the exemplary devices and elements described supra, methodologies that may be implemented in accordance with the disclosed subject matter will be better appreciated with reference to the flow chart disclosed herein and illustrated in, for instance and not limited to, FIG. 12. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The non-limiting methodologies shown in FIG. 12 can be implemented by a component or a portion of a component that includes at least a processor, a memory, and an instruction stored on the memory for the processor to execute.

Figure 25:
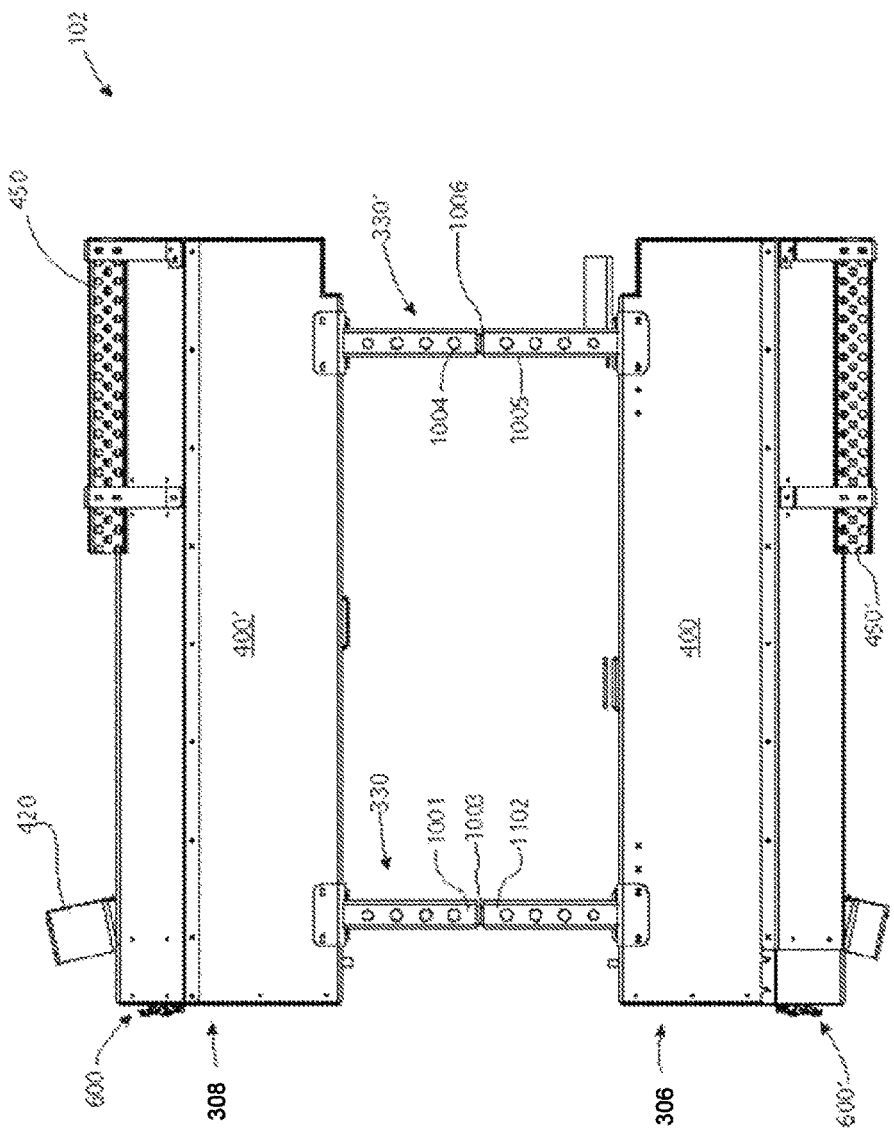
FIG. 25 is an illustration of an embodiment of a system that supports one or more containers in a horizontal orientation.

The provided subject matter may comprise one or more of the following: an O-ring face seal connection, which allows for easier assembly and more leak resistant connections; a container 200 adapted for being rail mounted, as seen in FIGS. 25-26, rail mounting being characterized by a container 200 adapted to be neck mounted in rail mount configuration, as opposed to strap mounted; a vertical container 200 mounted behind a cabin 504, which is adapted for increased capacity; modular construction of fuel module 600 (also referred to as "manifold 600"), which reduces bends in and complex paths conduit 640 for more efficient and increased fuel flow without reducing flow pressure and reduces number of potential leak points; a fuel module 600 may, optionally, be an integrated fuel control module 605 adapted for integration within the frame 300 which may simplify assembly; an ergonomic fill port 632 location which is adapted to allow filling by a user without necessitating the user to bend over; a torque bolt and/or Huck bolt fastener 304; an electric solenoid (not shown); an RFID (not shown) on a container 200 or system 100, 102, which can be adapted to allow fleet managers, operators, or other users to track necessary data regarding container 200 or system 100, 102, including, but not limited to, manufacture date, QC inspector, ship date, installation date, installer, critical service dates/history, on-demand manufacturing, maintenance information, or some combination thereof; a backup camera (not shown) engaged with a display for a backup camera adapted to assist an operator with operation of a vehicle 500 by providing visual data about the environment around the vehicle 500; a powder coated exterior surface 410, which offers excellent durability in the field and may be matched to manufacture approved colors or trade dress; an in-cab interface panel, which may comprise a communications component mounted in a cabin 504 of a vehicle 500 for real-time status related to system 100, 102 or to CNG contained therein, such as, but not limited to, pressure of contents, temperature of contents and the projected distance which the vehicle 500 can travel with the remaining contents; a shock mount 310, which is a dampening component adapted for installation between a component of a vehicle 500, such as a frame or chassis, and the frame 300 of the system 100, 102.

The provided subject matter may provide structural stress analysis; increased range offering, in certain embodiments, offering 12 more diesel gallon equivalent ("DGE") than certain third party or third parties, while also offering an enhanced back of cab unit with range of 163 DGE; an assembly line ready system 100, 102, which may be adapted to be operationally engaged with a conventional vehicle 500 with tooling and/or parts common to conventional operational engagement of a diesel or gasoline fuel tank; a system 100, 102 that consists of conventional components commonly available and adapted to be installed with the tools and materials available in a vehicle maintenance facility, such as, without limitation, a professional mechanic's work garage or truck stop.

The provided subject matter may further include the following sub-systems or components. The system 100, 102 may comprise a GPS (not shown), which may be adapted to allow operators and fleet managers to access location information, including the location of refueling and service center locations and route tracking. The system 100, 102 may comprise a lighted access doors 420, which may be adapted to make fueling, inspection and maintenance easier in a variety of lighting conditions by providing lighting to the region accessed through the access door 420. The system 100, 102 may comprise a cold weather package, which may comprise adaptations to allow for filling and efficient operation in extreme cold weather environments such as, without limitation, insulation, a resistive heater, a heat exchanger, a thermostat, or combinations thereof. A cold weather package may comprise a fuel warmer adapted to prevent problems, such as, without limitation, freeze up, imprecision in flow measurement, damage to flow regulation components or measurement components, condensation, liquid accumulation within the fuel delivery lines 642 or other supply path to the engine (not shown), or "chugging" of the engine (not shown) of the vehicle 500 due to fuel being colder than desired during operation in very cold environments by heating at least a portion of the fuel. Without limitation a fuel warmer may heat fuel fed into a regulator, fed from a regulator, or fuel in other components of the system, such as, without limitation a container 200. A fuel warmer may comprise any sort of heater or heat exchanger adapted to supply heat to the CNG fuel. A fuel warmer may comprise a resistive heater operatively engaged with the fuel system and adapted to convert electrical energy into heat.

Figure 21:
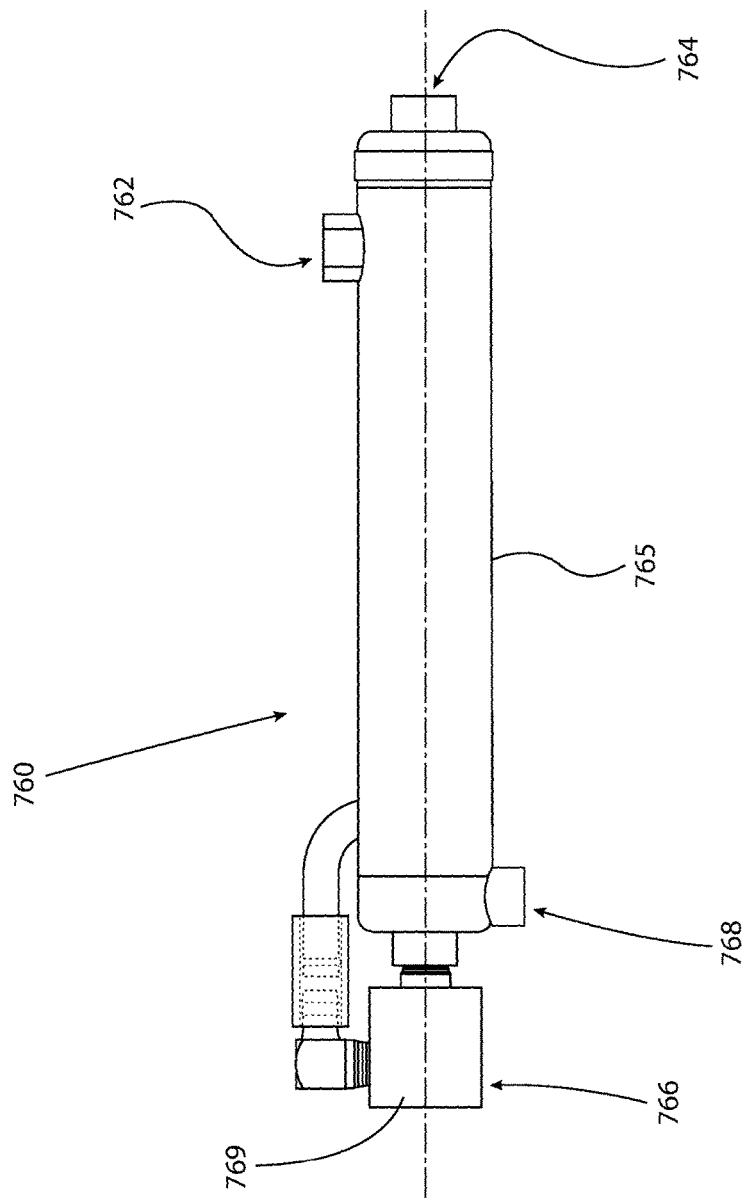
FIG. 21 is a depiction of one embodiment of a heat exchanger.

In the non limiting embodiment shown in FIG. 21, a heat exchanger 760 adapted to transfer heat from an engine coolant (not shown) of the vehicle 500 to a fuel flow of CNG in the system 100, 102. The heat exchanger 760 may be a parallel flow heat exchanger adapted to receive an input flow of hot coolant (not shown) into coolant input aperture 762, to receive an input flow of cold fuel (not shown) into fuel input aperture 764, to transfer heat from the hot coolant (not shown) to the cold fuel (not shown) within a body 765 to yield a warm fuel and cool coolant, to output the cool coolant (not shown) from coolant output aperture 766, and to output the warm fuel from fuel output aperture 768. The heat exchanger may comprise an integral thermostat 769 adapted to control a valve to control flow of coolant (not shown) or fuel (not shown) or both within the heat exchanger 760 in order to prevent over-heating of the fuel (not shown) or over-cooling of the coolant (not shown).

The system 100, 102 may comprise a bruise protection component, such as, without limitation a transducer, coating or material (not shown) adapted to indicate or assist in visual detection of an impact area, dent, scratch, bruise, or other damage to a container 200 of other component of system 100, 102. Such a coating or material (not shown) may consist of a brittle or easily cracked superfluous overcoat prone to being cracked or crazed by any event sufficient to damage the over coated container. Such a coating or material (not shown) may consist of a shiny, reflective or other overcoat prone to developing easily visually detectable optic irregularity as a result of any event sufficient to damage the over coated container. Such a bruise protection component may be complemented by support to an end user in the field when integrity of tanks are in question.

In one non-limiting embodiment, a container 200 can be mounted behind a cabin 504 of a vehicle 500. Vertical mounting of containers 200 may provide increased capacity and range, thereby allowing the vehicle 500 to travel further distances between refueling. Also, a larger container 200 may provide a lower center of gravity, increasing the stability of the unit and reducing weight to the less tanks. In certain applications, for aesthetic reasons or due to the other design requirements, mounting other than vertical mounting, such as horizontal or slanted mount may be desirable.

As noted above, the container 200 can be mounted within a frame with a strap or straplessly. As shown in FIGS. 4-9, strapless mounting may be provided by neck mounting containers 200 one or more neck mounts 322, 332 associated with frame 300.

As noted above, a system 100, 102 may comprise O-ring Face Seal Connections ("ORC") 608 that provide easier assemblies, as ORC rely on the compression of an elastomer O-ring and provide more leak resistant connections.

As noted above, a system 100, 102 may comprise one or more types of communications component (not shown). A communications component (not shown) may include, but is not limited to an in-cab interface panel (not shown). The communications component (not shown) can comprise a graphic display mounted in the cab adapted to display information about the system 100, 102. Information about the system 100, 102 may comprise, without limitation, information selected from the set consisting of real time pressure of the contents of a container 200, temperature of the contents of a container 200, and temperature-compensated amount of fuel. Information about the system 100, 102 may be real time information. The communications component (not shown) may display information to the driver while he operates the vehicle. The communications component (not shown) can further allow display of a video provided from an optional back-up camera (not shown).

FIGS. 13-17 show multiple embodiments of a modularly constructed fuel module 600. Without limitation, a fuel module 600 may include a manifold block 610. A manifold block 610 may be used rather than tubing or other conduit 640 and thereby may reduce or eliminate rigid tubing or other conduit 640. Reducing or eliminating rigid tubing or other conduit 640 may result in more efficient fuel flow without reducing flow pressure while also reducing the number of potential leak points. Without limitation, a fuel module 600 may include an improved regulator 620. In a particular embodiment, the system 100 and 102 can include dual regulators. For instance, dual regulators can be utilized to improve delivery of CNG. In some embodiments regulator 620 may be adapted to fuel either 12L or 9L diesel engines. The provided subject matter may include an Integrated Fuel Control Module 605 that is integrated within the superstructure of a system 100, 102 allowing for simpler assembly and installation.

The provided subject matter includes a fuel control module 600 ergonomically located to permit filling. For instance, a user can fill or use the fuel control module 600 without having to bend over. A parallel passenger side fill port may be provided to permit filling the system 100, 102 from either side of the vehicle 500. A fuel transfer port 636 and shut-off valve 637, adapted to permit a user to control flow through the fuel transfer port 636, are adapted to permit transfer of fuel between vehicle 500 and a storage container or between vehicle 500 and another vehicle (not shown). A fast-fill port 632 is provided for quicker filling of the system 100, 102 from distribution filling stations (not shown). A fast fill port may have an internal diameter of 12 mm, 16 mm, or greater.

The provided subject matter may be adapted for seamless integration with a third-party manufacturer of semi trucks or vehicles 500 such that the style of the systems 100 and 102 blend with the existing design. The provided subject matter comprises horizontal (e.g., also referred to as rail mounted or saddle mounted shown in FIGS. 10, 11, and 22-29) system 102 and vertical system 100 (e.g., shown in FIGS. 3-9 and 19) that fits behind the third-party vehicle manufacturer fairings 512 (e.g., system 100), or on a side of a third party vehicle manufacturer fairing 512 (system 102), to maintain a clean appearance to the installation/conversion from conventional diesel tanks (not shown) to use of the system 100, 102. The provided subject matter may utilize an electric solenoid (not shown) to control a valve. An electric solenoid controlled valve may be adapted to protect a driver and surrounding environment 90 should an accident prevent the driver from being able to close control valves 631 to close off the CNG supply. For example, electric solenoids, engaged with a controller or computer (not shown) adapted to detect an accident, may in turn control an automatic valve (not shown) operable to close off the CNG supply at a module 600 or at a container 200. It should be understood that the present subject matter may also include the above mentioned typical manually operated control valves 631 to close off the CNG supply. Such typical manually operated control valves 631 to close off the CNG supply may be adapted to be operated to shut off fuel flow independently of the action of any electric solenoid controlled valve.

RFID can utilize RFID technology (other components in the future), to allow fleet managers to track necessary data regarding a container 200, including manufacture date, quality control (QC) inspector, ship date, installation date and installer, and critical service dates/history. The provided subject matter can include a backup camera (not shown) adapted to provides through a communications component, an in-cab display of backup camera video, adapted to assist the driver during backing operation of the truck or other vehicle 500.

The provided subject matter may be assembly line ready. The disclosed design and/or system may be modular in nature having a design engineered to be completely self-contained and easy to install and thereby adapted to reduce assembly and time. Assembly may consist of lowering the completed unit into position, securing it to the frame and making connections to a portion of a chassis 510 on the vehicle 500. Assembly may also include establishment of one or more connections to establish communication of one or more of fuel, electricity, or coolant between the system 100, 102 and the vehicle 500.

As shown in the non limiting embodiment illustrated in FIGS. 19a-19e for vertical orientation of the system 100 and FIGS. 22-29 for horizontal orientation of the system 102, the provided subject matter may includes one or more shock mounts 310 that offers protection from impact loads and transportation vibration. Shock mounts 310 may comprise elastomeric dampers or another component adapted to emulate a spring-damper and chosen with good engineering judgment. The provided subject matter may includes one or more mounting brackets 390, substantially rigid structural members adapted for engagement between the chassis 510 and the frame 300. As shown in FIGS. 19a-19e, the mounting brackets 390 may be engaged to the frame 300 through a shock mount 310. Mounting brackets 390 and shock mounts 310 are further illustrated in FIGS. 22-29 for a horizontal orientation.

The provided subject matter may include the following sub-systems or components. RFID on components which are adapted to provide operators and fleet managers access to on-demand manufacturing and maintenance information. RFID GPS coupling which are adapted to allow operators and fleet managers to access location information, including refueling and service center locations and route tracking.

Referring now to the non-limiting embodiments illustrated in FIGS. 1-11 and 22-29, In some non-limiting embodiments, a system 100, 102 can include one or more containers 200 that are configured to house a portion of compressed natural gas (CNG), each container 200 may be cylindrical in shape with a length, a diameter, and a first end 204 opposite a second end 206 in which the first end 204 may includes a valve opening 212; a frame 300 that encases the one or more containers 200; a casing 400 that surrounds the frame 300 and the one or more containers; the length of the one or more containers 200 are oriented in a vertical or horizontal position; the frame 300 attaches to a portion of a chassis 510 of a vehicle 500, wherein the frame 300, the casing 400, and the one or more containers 200 are located behind (e.g., vertical position for containers 200) a cabin 504 of the vehicle 500 or underneath (e.g., horizontal orientation for containers 200) a portion of a cabin 504 of the vehicle 500; and the one or more containers 200 are connected to the frame 300 with a first neck mount 322 for the first end 204 of each of the one or more containers 200 and a second neck mount 332 for the second end 206 of each of the one or more containers 200.

Referring now to the non-limiting embodiment illustrated in FIGS. 1-9, in system 100, the one or more containers 200 include a first container 220 of cylindrical shape having a first length and a first diameter that houses a first volume of compressed natural gas; a second container 240 of cylindrical shape having the first length and the first diameter that houses a second volume of compressed natural gas, wherein the second volume is substantially the same as the first volume; a third container 260 of cylindrical shape having a second length and a second diameter that houses a third volume, wherein the third volume is less than the first volume and the third volume is less than the second volume; and the third container 260 is situated between the first container 220 and the second container 240 in which the third container 260, the first container 220, and the second container 240 form a linear orientation parallel to at least one axle of the vehicle 500.

Referring now to the non-limiting embodiment illustrated in FIGS. 10-11 and 22-29, in system 102, the one or more containers 200 include a first container 270 of cylindrical shape having a first length and a first diameter that houses a first volume of compressed natural gas; a second container (not shown) of cylindrical shape having the first length and the first diameter that houses a second volume of compressed natural gas, wherein the second volume is substantially the same as the first volume. In system 102, the first container 270, and the second container (not shown) form a linear orientation in a substantially similar plane as at least one axle of the vehicle 500 and are oriented substantially horizontally.

It is to be appreciated that a number of containers 200 can be selected with sound engineering judgment for one of the system 100 or the system 102. In particular, a volume of the container 200 can also be selected with sound engineering judgment without departing from the scope of the subject innovation. For instance, a first container 220 can have a length of 120 inches with a 26 inch diameter, the second container 240 can have a length of 120 inches with a 26 inch diameter, and the third container 260 can have a length of 90 inches and a 26 inch diameter, wherein such containers in this embodiment can provide 163 DGE. In another instance, a first container 220 can have a length of 120 inches with a 26 inch diameter, the second container 240 can have a length of 120 inches with a 26 inch diameter, and the third container 260 can have a length of 90 inches and a 21 inch diameter, wherein such containers 200 in this embodiment can provide 148 DGE. It is to be appreciated that the above are solely for example and not to be limiting on the subject innovation. It is also to be appreciated that, as the term is used herein unless otherwise noted, cylinder may encompass substantially cylindrical containers 200 that have one or more edges filleted or otherwise rounded, or have one or more ends of the cylinder to be domed or curved or which otherwise deviate slightly from a strict cylindrical shape. The number of containers 200, the length of each container 200, and/or the diameter of each container 200 can be modified to yield various DGE. Moreover, a mount for a container 200 can include specifications based on the size of the container 200. In an embodiment, a container 200 with a 26 diameter can include a 2.75 inch neck, whereas a container 200 with a 21 inch diameter can include a 2 inch neck.

The subject innovation further includes a mount for each container 200 used within the system 100 and/or the system 102 that provide connectivity to a neck 210 of the respective container 200. In an embodiment, a controller (not shown) can evaluate a distance for the vehicle 500 to travel and one or more volumes associated with a number of containers 200 used with the system 100 or system 102. Based on the distance and a parameter, the controller (not shown) can identify which container 200 or containers 200 to utilize with the system 100 or the system 102 with the vehicle 500. It is to be appreciated that the parameter can be, but is not limited to being, an inventory of CNG, an amount of CNG in a container 200, a volume amount of a container 200, a number of containers 200 the system 100 or system 102 can house, an amount of CNG in a container 200 with a particular volume, a temperature of an environment 90, a cost of diesel fuel, a cost of CNG, a weight of a load transported by the vehicle 500, a weight of a container 200, a type of mount used with a container 200, among others.

In still another embodiment, the first container 220 can be housed by the first side 306 and supported by one or more neck mounts 322, 332, one or more straps (not shown), or one or more other components mounted to the first side 306, the second container 240 can be housed by the second side 308 and supported by one or more neck mounts 322, 332, one or more straps (not shown) or one or more other components mounted to the second side 308, and the third container 260 can be housed by a region defined between the first side 306 and the second side 308 and supported by the connecting member 330. As discussed, it is to be appreciated that a fuel module 600 or a manifold 600, 600' can be utilized with the system 100 or system 102. For instance, the system 100 or system 102 can utilize a first manifold 600 for containers 200. In another instance, the system 100 or system 102 can utilize a first manifold 600 and a second manifold 600' for containers 200. In still another embodiment, the system 100 or system 102 can utilize two or more manifolds 600, 600' with the containers 200.

In some embodiments, the system 100, 102 may include a communications component (not shown) that provides at least one of the following: an aggregation of a portion of data related to a flow of compressed natural gas, a pressure of the one or more containers 200, an amount of compressed natural gas in the one or more containers 200, a range of travel based at least in part on the amount of compressed natural gas housed within the one or more containers 200; an interaction with a portion of the data; a display of a portion of data; a display of a video from a rear-facing camera (not shown) affixed to the vehicle 500; a communication with a remote terminal via at least one of voice, text, audio, video, or electronic message; or a receipt of a communication from the remote terminal, wherein the remote terminal is a fleet manager, a user, a transport facilitate, or a shipping facility.

In certain embodiments, the system 100, 102 may include a settings component adapted to configure a setting associated with the one or more containers 200 based on a weather condition to regulate a pressure for the compressed natural gas.

Referring now to FIGS. 20A, 20B, 20C, and 20D, in certain non-limiting embodiments, the system 100, 102 may comprise a pressure release device ("PRD"). It is to be appreciated that a PRD is illustrated in system 100 but can also be adapted to be used with system 102 represented in FIGS. 22-29 such that the PRD is affixed or placed on a container 200. A PRD is a device adapted to sense one or more physical parameters, such as, without limitation, pressure, temperature, or stress, within or around a container 200 and to vent the contents of the container 200 to environment 90 if the one or more physical parameters meet a predetermined standard. In one embodiment a PRD may be adapted to sense pressure within a container 200 and to vent the contents of the container 200 to environment 90 if the pressure is more than some predetermined pressure. In some non-limiting embodiments, the predetermined pressure may be 50% of the maximum pressure a container 200 may contain without bursting or otherwise failing.

In one non-limiting embodiment, as shown in FIGS. 20A, 20B, 20C, and 20D, a PRD may be adapted to sense temperature nearby a container 200 and to vent the contents of the container 200 to environment 90 if the temperature is more than some predetermined activation temperature. In certain non-limiting embodiments, as shown in FIGS. 20A, 20B, 20C, and 20D, the PRD 700 comprises a temperature sensitive component 720 adapted to respond to the predetermined activation temperature and a valve 740. Temperature sensitive component 720 may comprise a wire component (not shown) encased within a cylinder tubing 726. Valve 740 may comprise an inlet aperture 742 in operational engagement with a container 200 and an outlet aperture in operational engagement with the environment 90. The PRD 700 and or any components thereof may be operatively engaged with a first container 220, a second container 240, a third container 260, or some combination thereof. In operation, if temperature sensitive component 720 is exposed to a temperature equal to or exceeding the predetermined activation temperature for some predetermined activation time, the valve 740 opens to provide fluid communication between engaged container 200 and the environment 90 so that the contents of the container 200 may vent to environment 90. Without limitation, in some embodiments the predetermined activation temperature may be 110+/−5 degrees Centigrade. Without limitation, in some embodiments the predetermined activation time may be 20-30 seconds.

In certain non-limiting embodiments, a system may comprise one or more transducers sufficient to sense data regarding a plurality of physical parameters within or around a container 200; a controller adapted to accept data regarding the plurality of physical parameters within or around a container 200 from the one or more transducers, to process the data in some predetermined way, and to produce an output signal of the results of the process indicate venting; and a valve adapted to be opened by the output signal in order to provide fluid communication between engaged container 200 and the environment 90 so that the contents of the container 200 may vent to environment 90.

In certain embodiments, the one or more containers 200 may include a liner made of a first material. In certain embodiments, the first material is a plastic. In certain embodiments, the one or more containers 200 may include a wrapping of a second material. In certain embodiments, the second material is at least one of a carbon fiber, a composite material, a Teflon, or a disparate material from the first material. In certain embodiments, the one or more containers 200 is made of at least one of a metal, a plastic, a polymer, or a composite material.

In certain embodiments, the frame 300 is made from at least one of a steel, an alloy, an aluminum, or a metal.

Referring now to the non-limiting embodiments shown in FIGS. 1-19 and 22-29, in certain embodiments, the system 100, 102 may include a first manifold 600 and a second manifold 600'. The second manifold 600' may comprise all of the components that the first manifold 600 comprises or it may comprise a subset of the components that the first manifold 600 comprises.

With continued reference to the non-limiting embodiments shown in FIGS. 1-19 and 22-29, in certain embodiments, the system 100, 102 may includes a regulator 620 that is configured to receive a portion of compressed natural gas at a first pressure level and convert the portion of compressed natural gas to a second pressure level. In a particular embodiment, the system 100 and 102 can include dual regulators. For instance, dual regulators can be utilized to improve delivery of CNG. In certain embodiments, the regulator 620 is adjustable to permit a user to select a second pressure level between zero and the first pressure level, inclusive. In certain embodiments, regulator 620 may comprise an elastomeric diaphragm. In certain embodiments, regulator 620 may comprise have a stainless steel bellows-type diaphragm. In some embodiments, the regulator may comprise a stainless steel bellows-type diaphragm adapted to operate properly at temperatures as low as −200 degrees F. (−128 degrees C.).

In certain embodiments, the system 100, 102 includes an electrical connector component (not shown) that couples to at least one of an electrical component (not shown) of the vehicle 500. For example, and without limitation, in conventional vehicles, there is typically an electrical system (not shown) comprising one or more of an alternator or other electrical generator and a battery or other energy storage device adapted to supply electrical energy. Known methods and apparatuses for operationally engaging the electrical system of a vehicle 500 may be adapted for use with system 100, 102 in order to provide an electrical connector component (not shown) that may be used to readily couple with the electrical system (not shown) of vehicle 500. An electrical connector component (not shown) coupled with the electrical system (not shown) of vehicle 500 may be used to supply system 100, 102 with electrical energy. Electrical energy supplied to system 100, 102 may be used to power a component of the system 100, 102 such as, without limitation, a light, a lighted access door 420, a communication component (not shown), a computer (not shown), a controller (not shown), an amplifier (not shown), a resistive heater (not shown), a security system (not shown), a camera (not shown), a cellular device (not shown), a GPS device (not shown), an electric solenoid valve (not shown), a data store (not shown), or other component chosen with good engineering judgment.

In certain embodiments, the system 100, 102 includes a fuel connector component 642 adapted to fluidly communicate with at least one of a hose (not shown) of the vehicle 500 or a fuel line (not shown) of the vehicle 500, wherein the fuel connector component 642 is adapted to output of a portion of compressed natural gas from the one or more containers 200 to a portion of an engine (not shown) of the vehicle 500.

As shown in FIGS. 1-9 and 19 for a vertical orientation of system 100 and in FIGS. 10-11 and 22-29 for horizontal orientation for system 102, in certain embodiments, a system 100, 102 may include a first manifold 600 located on a driver side 506 of a first vehicle 500; a second manifold 600' located on a passenger side 508 of the first vehicle 500. In such embodiments, first manifold 600 may comprise a fast-fill port 632 adapted to receives a portion of compressed natural gas to contain within one or more containers 200 at a first rate of flow; a fuel transfer port 636 configured for fluid communication of a portion of compressed natural gas between a container (not shown) affixed to a second vehicle (not shown) and the one or more containers 200 of the first vehicle 500 and also configured for fluid communication of a portion of compressed natural gas between the one or more containers 200 of vehicle 500 and a storage container (not shown) such as, without limitation, a storage container at a garage, depot, or other site; and a transfer valve 637 that is configured to control flow for the fuel transfer port 636. In some non-limiting embodiments, the container (not shown) affixed to a second vehicle (not shown) may be substantially identical to one or more containers 200 of the first vehicle 500. In some non-limiting embodiments, the second vehicle (not shown) may be substantially identical to the first vehicle 500.

As shown in FIGS. 1-9 and 19 for vertical orientation of system 100 and FIGS. 10-11 and 22-29 for horizontal orientation of system 102, and shown in detail in FIGS. 13-18, the first manifold 600 further comprises at least one of the following: a fast-fill port 632 adapted to receive a portion of compressed natural gas to contain within one or more containers at a first rate of flow; a fuel transfer port 636 that is configured for fluid communication of a portion of compressed natural gas between a container (not shown) affixed to a second vehicle (not shown) and the one or more containers 200 of the first vehicle 500 and also configured for fluid communication of a portion of compressed natural gas between the one or more containers 200 of vehicle 500 and a storage container (not shown) such as, without limitation, a storage container at a garage, depot, or other site; a transfer valve 637 that is configured to control flow for the fuel transfer port 636; a shut-off valve 631 that is configured to regulate flow between one or more of the containers 200 to an engine of the first vehicle 500; a fill port 634 that is configured for fluid communication of a portion of compressed natural gas at a rate up to second rate of flow between a compressed natural gas source and the one or more containers 200 of the first vehicle 500, wherein the second rate of flow is less than the first rate of flow; and a pressure gauge 635 that is configured to sense the pressure of a portion of the compressed natural gas for the one or more containers 200.

As shown in FIGS. 1-9 and 19 for vertical orientation of system 100 and FIGS. 10-11 and 22-29 for horizontal orientation of system 102, and shown in detail in FIGS. 13-18, the second manifold 600' further comprises a manifold block 610', a shut-off valve 631' that is configured to regulate flow between the one or more containers 200 to an engine (not shown) of the first vehicle 500; a fill port 634' that is configured for fluid communication of a portion of compressed natural gas at a rate up to a second rate of flow between a compressed natural gas source and the one or more containers 200 of the first vehicle 500, wherein the second rate of flow is less than the first rate of flow; and a pressure gauge 635' that is configured to collect a pressure reading of a portion of the compressed natural gas for the one or more containers 200.

As shown in FIGS. 1-9 and 19 for vertical orientation and FIGS. 10-11 and 22-29 for horizontal orientation, in certain non-limiting embodiments, system 100, 102 may include one or more containers 200 that are configured to house a portion of compressed natural gas (CNG), each container 200 may be cylindrical in shape with a length, a diameter, and a first end 204 opposite a second end 206 in which the first end 204 includes a valve opening 212; a frame 300 that encases the one or more containers 200; a casing 400 that surrounds the frame 300 and the one or more containers 200; the length of the one or more containers 200 are oriented in a vertical or horizontal orientation; the frame 300 attaches to a portion of a chassis 510 of a vehicle 500, wherein the frame 300, the casing 400, and the one or more containers 200 are located behind a cabin of the vehicle 500 or underneath a portion of cabin 504 and along a side of the vehicle 500; the one or more containers 200 are connected to the frame 300 with a first neck mount 322 for the first end 204 of each of the one or more containers 200 and a second neck mount 332 for the second end 206 of each of the one or more containers 200; a driver-side manifold 600; and a passenger-side manifold 600'. In certain embodiments, such a system 100, 102 may further include an RFID tag (not shown) associated with at least one of the one or more containers 200, a portion of the driver-side manifold 600, a portion of the passenger-side manifold 600', a regulator 620 for the system 100, 102, a valve 631, 631' used in at least a portion of the system 100, 102.

In certain embodiments, the system 100, 102 may include an RFID reader component (not shown) that is configured to collect a portion of data from the RFID tag (not shown) triggered by a geographic proximity between the RFID tag (not shown) and the RFID reader component (not shown). In an embodiment, the system includes an RFID writer component (not shown) that incorporates a portion of data with the RFID tag (not shown) based on the association of the at least one of the one or more containers 200, a portion of the driver-side manifold 600, a portion of the passenger-side manifold 600', a regulator 620 for the system 100, 102, a valve 631, 631' used in at least a portion of the system 100, 102. In certain embodiments, the portion of data relates to at least one of an inspection date, a type of inspection, a manufacture date, a date, a time, a location, an inspection due, a shipping date, a quality control inspection, or a service notification.

As shown in FIGS. 1-9, and 13-19, in certain non-limiting embodiments, the system 100, 102 may comprise a first container 220, a frame 300, a first manifold 600, a second manifold 600', and a casing 400. The first container 220 may be configured to house or contain compressed natural gas. The first container 220 may be engaged with frame 300. The frame 300 has a first side 306 and a second side 308 opposite the first side 306. The frame 300 may substantially shroud at least the first container 220. The first manifold 600 may be engaged proximate to the first side 306 of frame 300. The second manifold 600' may be engaged proximate to the second side 308 of the frame 300. The casing 400 may at least partially surrounds the frame 300, the first container 220, the first manifold 600, and the second manifold 600'. The first manifold 600 may comprise a fast-fill port 632, a fuel transfer port 636, and a transfer valve 637. The fast-fill port 632 may be in fluid communication with the first container 220, and may be adapted to receive compressed natural gas at any rate up to a first rate. The fuel transfer port 636 may be in fluid communication with the first container 220, and may be adapted to transfer compressed natural gas. The transfer valve 637 may be configured to regulate the fluid communication of the fuel transfer port 636. The frame 300 may substantially shrouds the first manifold 600.

The system 100, 102 may further comprise a second container 240 configured to house or contain compressed natural gas. The frame 300 may substantially shroud the second container 240. The second manifold 600' may comprise a fast-fill port 632', a fuel transfer port 636', and a transfer valve 637'. The fast-fill port 632' may be in fluid communication with the second container 240, and may be adapted to receive compressed natural gas at any rate up to a first rate. The fuel transfer port 636' may be in fluid communication with the second container 240, and may be adapted to transfer compressed natural gas. The transfer valve 637' may be configured to regulate the fluid communication of the fuel transfer port 636'. The frame 300 may substantially shroud the first manifold 600, the second manifold 600', and any number of containers 200. As noted above, the first container 220 and the second container 240, like any container 200, may comprise metal, metal partially wrapped with a fiber, or a composite material.

As shown in FIGS. 3-9 and 19 for a vertical orientation of system 100, in some embodiments, the frame 300 substantially shrouds the first manifold 600, the second manifold 600', first container 220, and second container 240, such that these components are mostly within the region internal to the frame 300 such that the shrouding of the first manifold 600, the second manifold 600', first container 220, and second container 240 by the frame 300 is sufficient to at least partially or fully protect them from collisions, falling, tumbling or other similar large mechanical events. It should be understood that in embodiments wherein the frame 300 partially or fully protect components such as, without limitation, the containers 200, the manifold 600, the manifold 600', and/or connections, ports, gauges, valves, and other components, from collisions, falling, tumbling or other similar large mechanical events, these protected components may be placed in locations or positions where placement without a protective frame 300 would otherwise present an unacceptable risk of rupture, leakage, or other damage due to potential collisions, falling, tumbling or other similar large mechanical events. For example, a frame 300 shrouded container 200 may extend below the chassis 510 of a vehicle 500 and still be protected from harm from roadway obstructions or other vehicles by the frame 300 where an unshrouded container would be exposed to greater risk of harm from roadway obstructions or other vehicles.

As shown in FIGS. 4-9 and 19, in some embodiments for a vertical orientation system 100, the first container 220 or the second container 240 may be connected to the frame 300 with a neck mount 322 or neck mount 332. The first container 220 may be cylindrical in shape with a length, a diameter, and a first end 224 opposite a second end 226. The second container 260 may be cylindrical in shape with a length, a diameter, and a first end 244 opposite a second end 246. The first container 220 may be connected to the frame 300 at the first end 224 of the first container 220 with a neck mount 322 that permits motion along an axis 221 defined by the length of the first container 220. The first container 220 may be connected to the frame 300 at the second end 226 of the first container 220 with a neck mount 332 that is substantially fixed along the axis 221 defined by the length of the first container 220. The latter provided neck mounting arrangement permits the first container 220 to expand and contract in response to changes in temperature or pressurization without being bound or damaged by the components that retain it while still providing a sufficiently fixed location for operative engagement of the other relevant components of the system 100, 102 thereto.

The second container 240 may be connected to the frame 300 at the first end 244 of the second container 240 with a neck mount 322 that permits motion along an axis 241 defined by the length of the second container 240. The second container 240 may be connected to the frame 300 at the second end 246 of the second container 240 with a neck mount 332 that is substantially fixed along the axis 241 defined by the length of the second container 240. The latter provided neck mounting arrangement permits the second container 240 to expand and contract in response to changes in temperature or pressurization without being bound or damaged by the components that retain it while still providing a sufficiently fixed location for operative engagement of the other relevant components of the system 100, 102 thereto. It should be noted that the axes 221, 241 may be oriented horizontally, vertically or at some other angle. It is to be appreciated that the neck mount 322, neck mount 332, and the like can be utilized with the system 102 (e.g., horizontal orientation illustrated in FIGS. 10-11 and 22-29).

As shown in FIGS. 1-11, 19, and 24, in certain non-limiting embodiments, the first manifold 600 may be in fluid communication with the first container 220 by way of a flexible conduit 820. The second manifold 600' in fluid communication with said second container 240 by way of a flexible conduit 840. It is to be appreciated that flexible conduit 840 can be utilized with the system 102 (e.g., horizontal orientation illustrated in FIGS. 10-11 and 22-29). Moreover, it is to be appreciated that the manifold connections in the system 100 and 102 can be rigid lines rather than flexible conduit. Generally, it is to be appreciated that the conduit can be at least one of flexible conduit or rigid conduit.

As shown in FIGS. 1-11 and 19a-19e, in certain non-limiting embodiments, the system 100, 102 may comprise a component adapted for attachment to a portion of an associated vehicle 500. In certain embodiments, the component adapted for attachment to a portion of a vehicle 500 comprises a shock mount 310 adapted for engagement to a chassis 510 of the associated vehicle 500.

As shown in FIGS. 1-9 and 19 for a vertical orientation of the system 100 and FIGS. 10-11 and 22-29 for a horizontal orientation of the system 102, FIGS. 13-18 illustrate either the first manifold 600 or the second manifold 600' or both comprising a component selected from the group consisting of a shut-off valve 631, 631', an internal check valve (not shown), an inlet fitting 632, 632', 634, 634', a fuel storage fitting 638, 638', a coalescing filter 639, 639', and a pressure gage 635, 635'. In certain embodiments, the first container 220 is in selectable fluid communication with the second container 240. This latter selectable fluid communication may adapted for control by a valve 228, 248.

As shown in FIGS. 1-11, 19, and 22-29, in certain non-limiting embodiments, the system 100, 102 is engaged with an associated vehicle 500, the first side 306 of the frame 300 may be associated with the driver side 506 of the vehicle 500 and the second side of the frame 300 may be associated with the passenger side 508 of the vehicle 500. In some embodiments in which the system 100, 102 is engaged with an associated vehicle 500, the first side 306 of the frame 300 may be associated with the passenger side 508 of the vehicle 500 and the second side of the frame 300 may be associated with the driver side 506 of the vehicle 500.

Generally, a container 200 may be any kind of container chosen with good engineering judgment and may, without limitation, consist of or comprise a cylinder, a tank, a housing, or a canister. The vehicle 500 may be any kind of vehicle chosen with good engineering judgment and may, without limitation, be selected from the group consisting of a semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, and the like.

In some embodiments the system 100, 102 will comprise one, two, three or more containers 200. In embodiments in which the system 100, 102 only comprises one container 200, first container 220, the system 100, 102 may comprise a structural bracket (not shown) to provide structural integrity and/or a location to which to brace.

Figure 6:
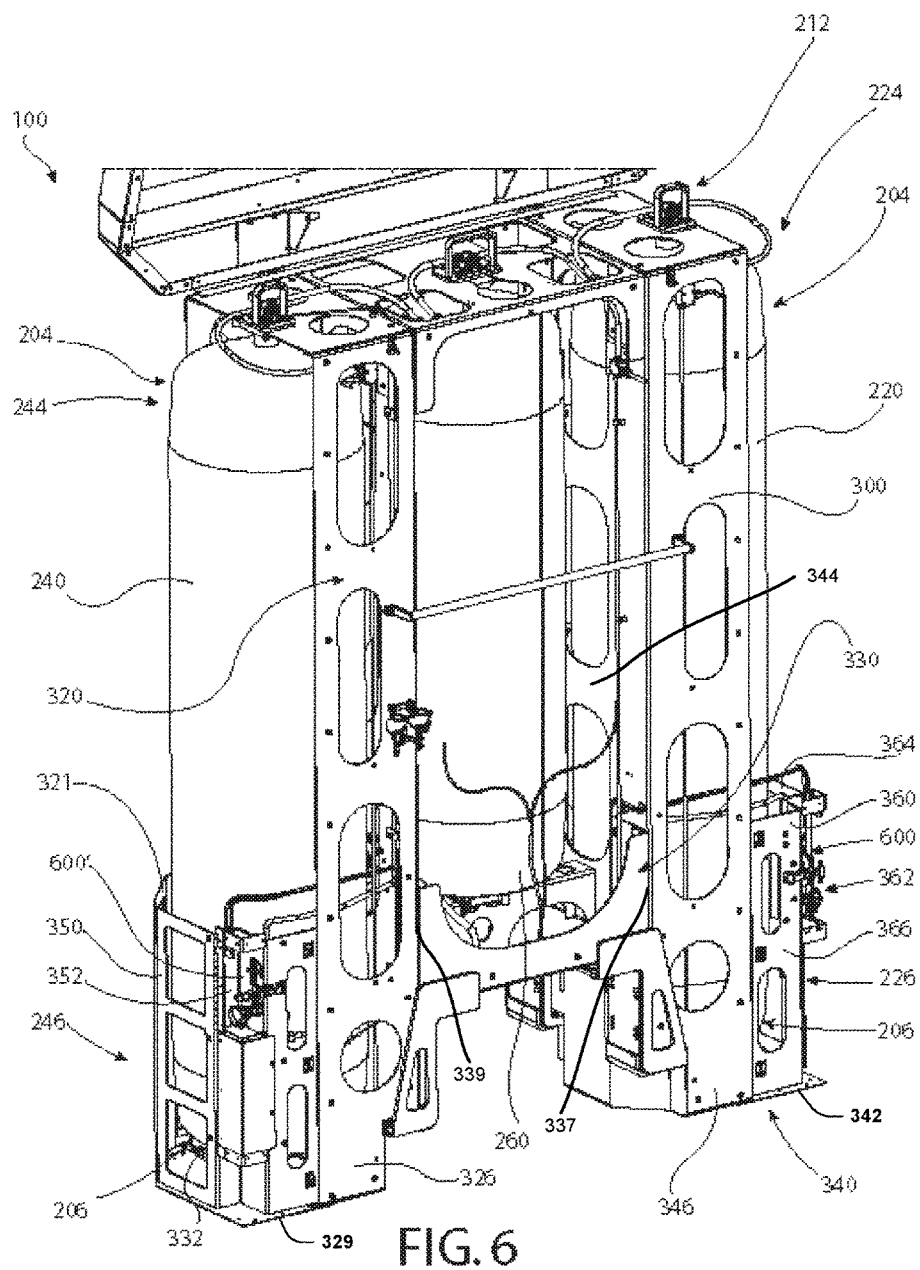
FIG. 6 is an illustration of the embodiment of the compressed natural gas (CNG) system engaged of FIG. 1 with part of the casing removed.
Figure 7:
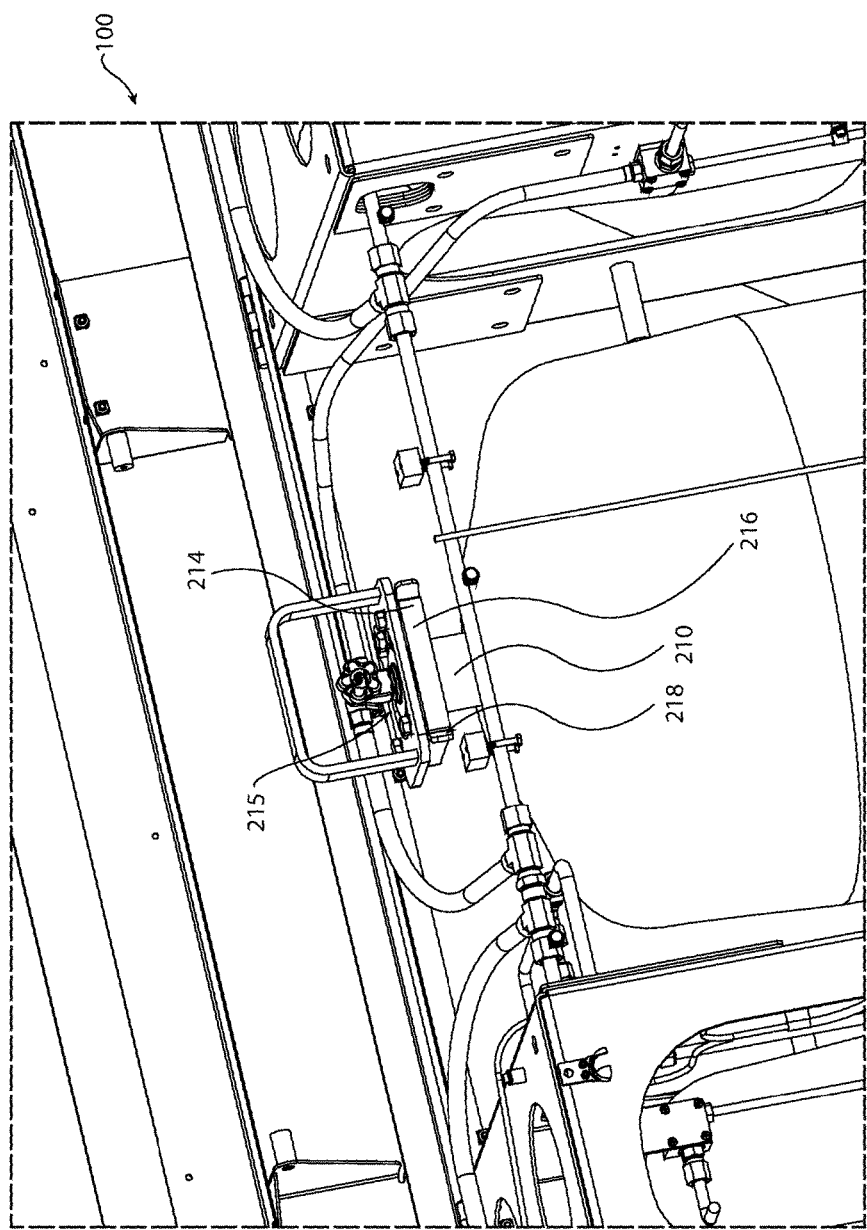
FIG. 7 is an illustration of the embodiment of the compressed natural gas (CNG) system engaged of FIG. 1 with part of the casing removed.
Figure 8:
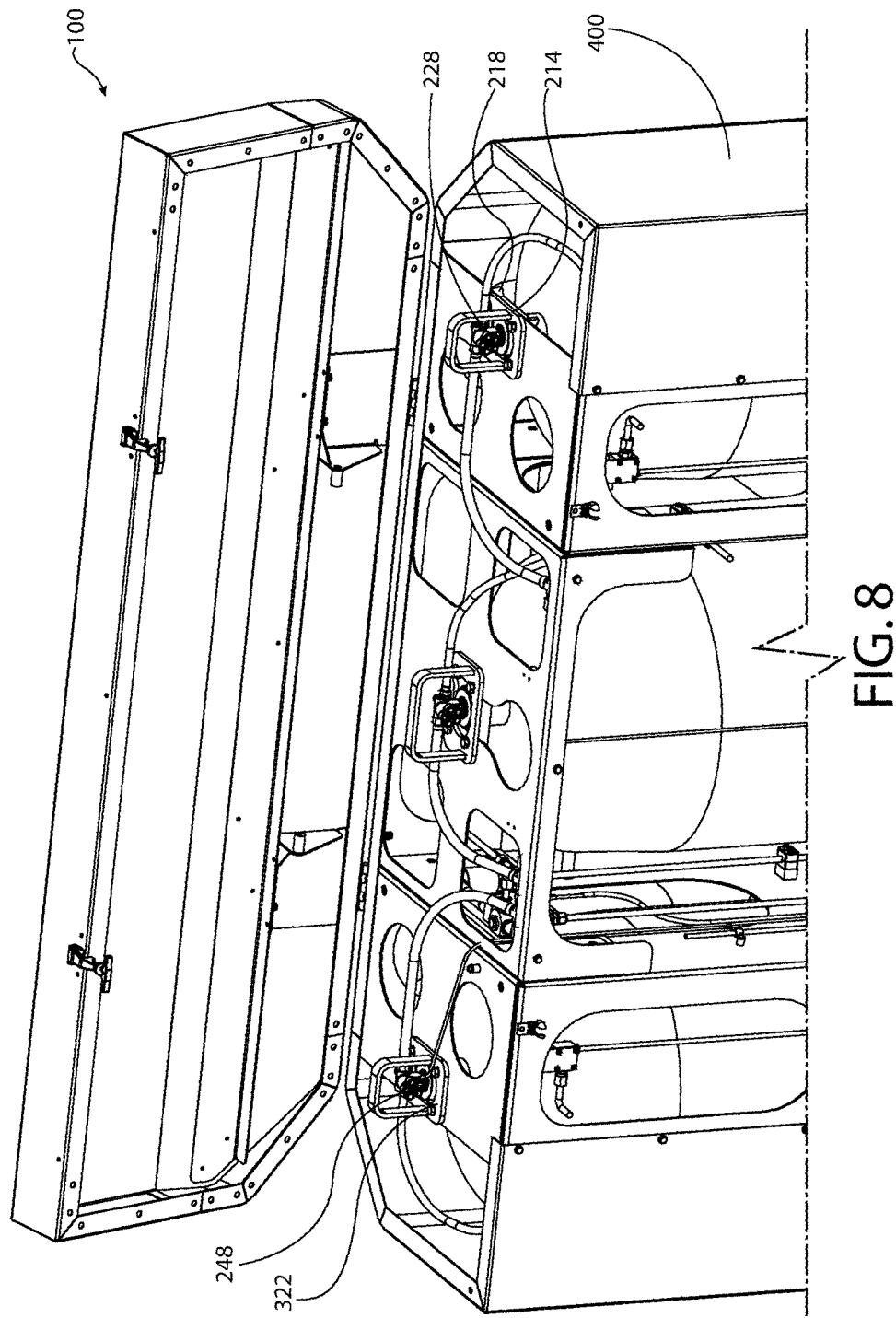
FIG. 8 is an illustration of the embodiment of the compressed natural gas (CNG) system engaged of FIG. 1 with part of the casing removed.
Figure 9:
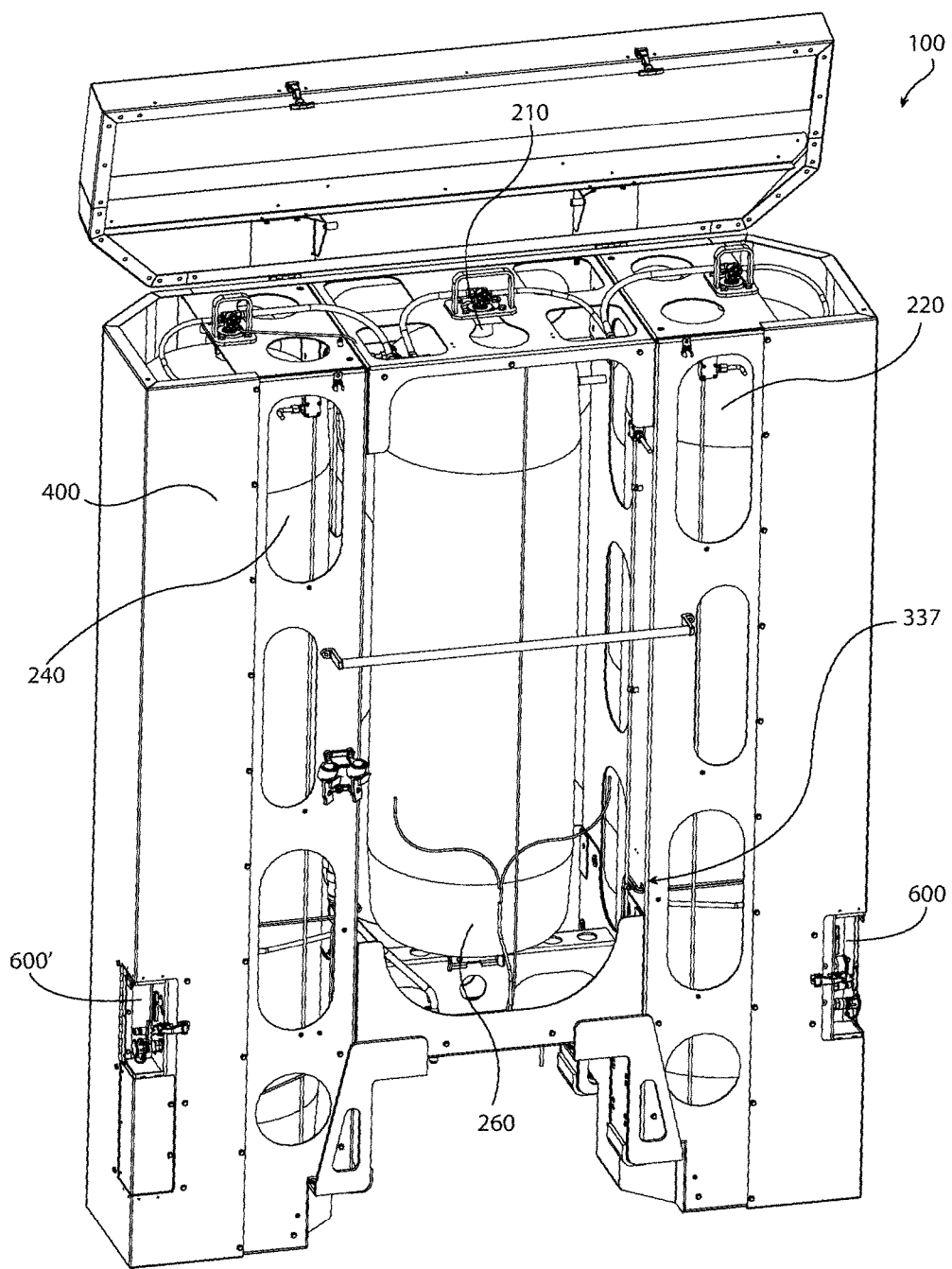
FIG. 9 is an illustration of the embodiment of the compressed natural gas (CNG) system engaged of FIG. 1 with part of the casing removed.
Figure 10:
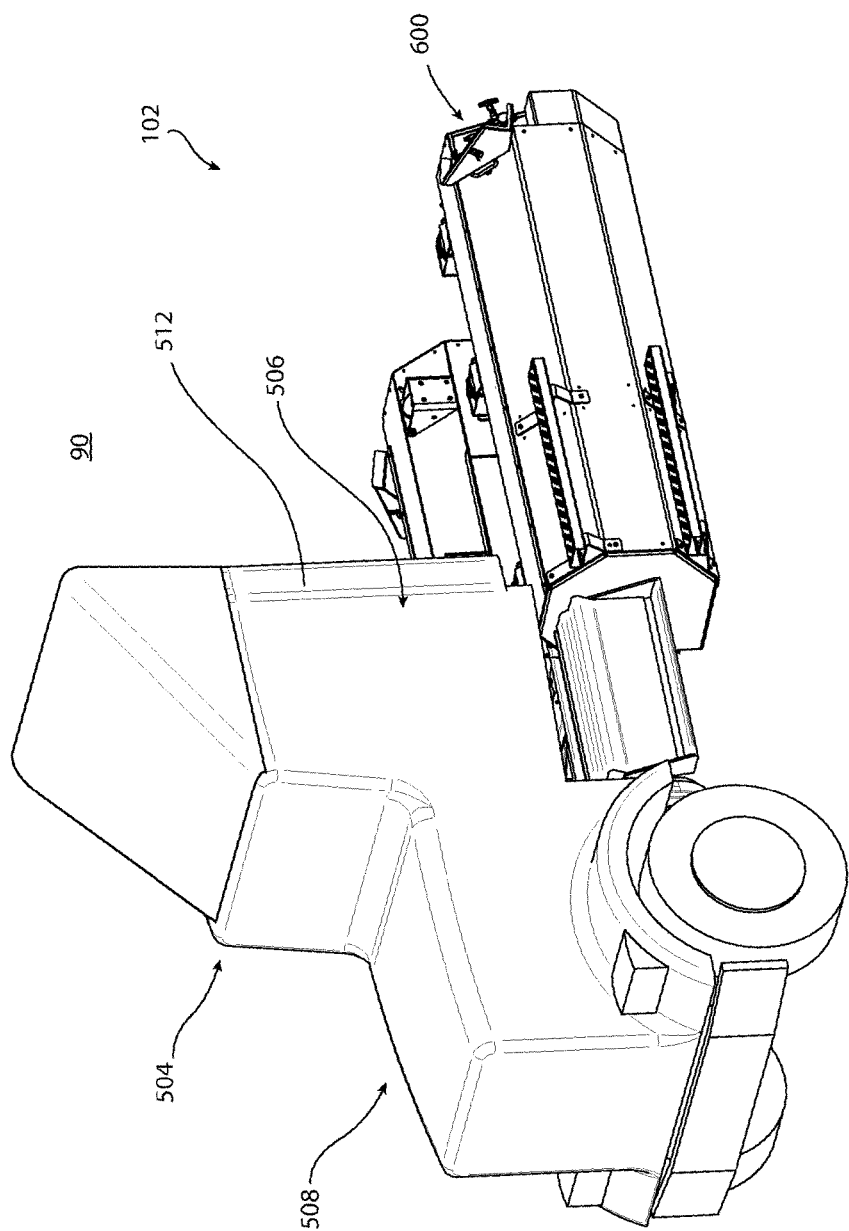
FIG. 10 is an illustration of a second embodiment of a compressed natural gas (CNG) system engaged with an associated vehicle in a horizontal orientation.
Figure 11:
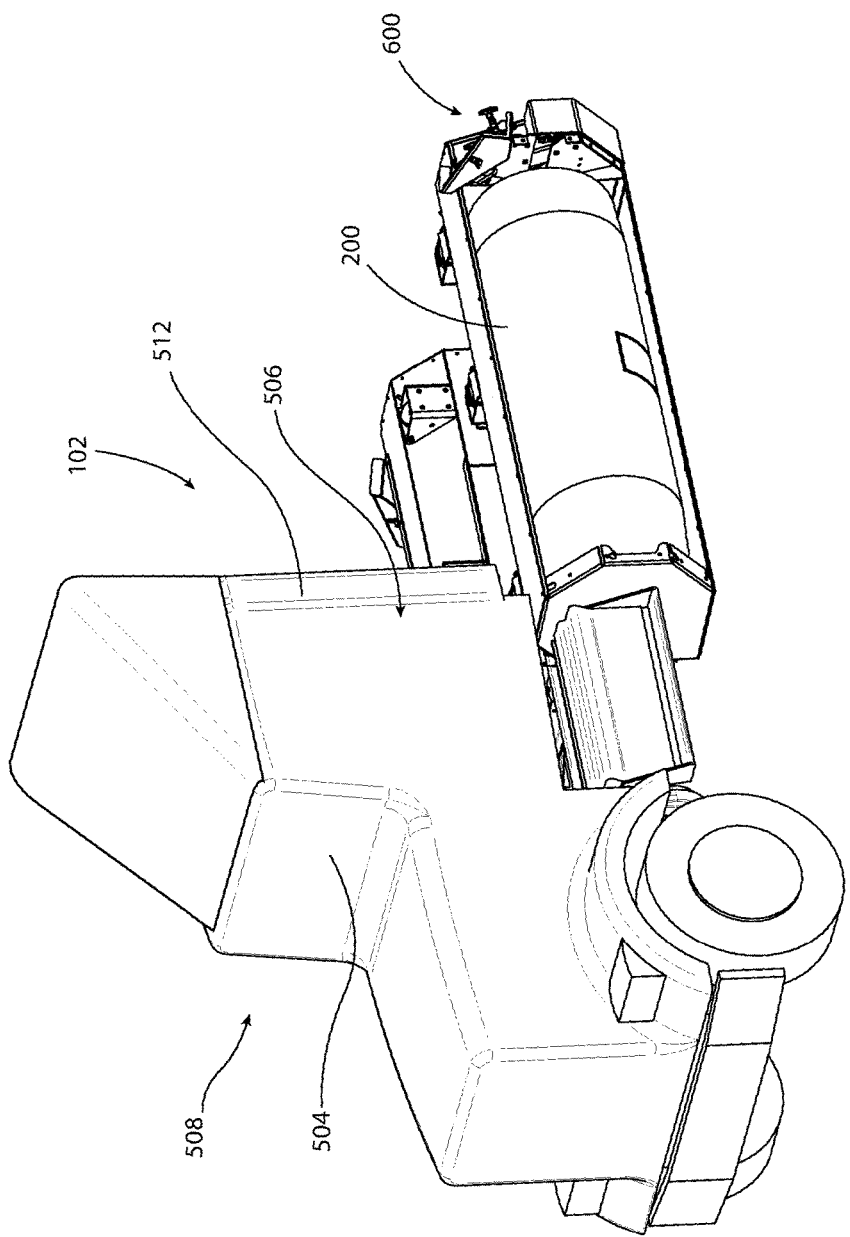
FIG. 11 is an illustration of the embodiment of FIG. 10 with a portion of the casing removed.

In an embodiment, FIG. 6 illustrates the system 100 with three (3) containers 200 housed and supported by at least frame 300. For instance, the system 100 and frame 300 can be used to house a single container supported by at least the connecting member 330 (e.g., in a middle section of the frame 300). In another embodiment, the system 100 and frame 300 can be used to house a first container and a second container, wherein the first container is supported by the first side 306 of the frame 300, the second container is supported by the second side 308 of the frame 300, and the connecting member 330 (e.g., middle section of the frame 300) is empty.

In a particular embodiment, a weight element (not shown) can be used as a counterweight or a counterbalance in the event that a configuration of containers is used that requires balancing. For instance, the system 100 and frame 300 can be used to house a first container and a second container, wherein the first container is supported by the first side 306 of the frame 300, the second container is supported by the connecting member 330 (e.g., middle section of the frame 300) and the second side 308 is empty. In such instance, the second side 308 can be configured to house a weight element that counterbalances a portion of weight associated with the containers supported by the connecting member 330 and/or the first side 306. Similarly, the system 100 and frame 300 can be used to house a first container and a second container, wherein the first container is supported by the second side 308 of the frame 300, the second container is supported by the connecting member 330 (e.g., middle section of the frame 300) and the first side 306 is empty. In such instance, the first side 306 can be configured to house a weight element (not shown) that counterbalances a portion of weight associated with the containers supported by the connecting member 330 and/or the second side 308.

As shown in FIGS. 1-9, and 19a-19e in certain non-limiting embodiments, the system 100 may comprise a frame 300 comprising of a set of distinct components for a vertical orientation of the system 100. Frame 300 may comprise a first support member 320, a first connecting member 330, an optional second connecting member 336, a second support member 340, a first shroud 350, and a second shroud 360. The first support member 320 may comprise a first base plate 329, and a first connector plate 324 engaged to the first base plate 329. The first connector plate 324 may optionally be substantially perpendicular to the first base plate 329. In some specific non-limiting embodiments, the first support member 320 may comprise a first base plate 329, a first connecting member 330, a first edge plate 324, and a third edge plate 328 offset from the first edge plate 326.

The first support member 320 may comprise a first edge plate 326 engaged to the first connector plate 324. The first edge plate 326 may, optionally, be substantially perpendicular to the first connector plate 324, or substantially perpendicular to the first base plate 329, or both. The first support member 320 may comprise a third edge plate 328 engaged with the first connector plate 324 and offset from the first edge plate 326. The third edge plate 328 may, optionally, be substantially perpendicular to the first connector plate 324, or substantially perpendicular to the first base plate 329, or both.

The first connector plate 324 may be engaged with a first end 339 of the connecting member 330. The connecting member 330 may be elongated having a second end 337 offset from and facing opposite from the first end 339. The second support member 340 may comprise a second base plate 342, and a second connector plate 344 engaged to the second base plate 342.

The second support member 340 may comprise a second edge plate 346 engaged with the second connector plate 344. The second edge plate 346 may, optionally, be substantially perpendicular to the second connector plate 344, or substantially perpendicular to the second base plate 342, or both. The second support member 340 may comprise a fourth edge plate 348 engaged with the second connector plate 344 and offset from the second edge plate 346.

The fourth edge plate 348 may, optionally, be substantially perpendicular to the second connector plate 344, or substantially perpendicular to the second base plate 342, or both. The second connector plate 344 may be engaged with a second end 334 of the connecting member 330.

The first shroud 350 may be engaged with the first support member 320 to define a first cavity 321 therebetween. The first shroud 350 may be engaged to the first connector plate 324, to first edge plate 326, third edge plate 328, or to some combination thereof. In some embodiments, the first connector plate 324, the first edge plate 326, the first shroud 350, and the third edge plate 328 together form a closed loop around first cavity 321. The first shroud 350 may have a first internal surface 354 and a first external surface 356. The first external surface 356 may define therein a first depression 352. The first depression 352 may be sufficient, in size and shape and depth and otherwise, to substantially shroud the first manifold 600 therein. In some embodiments, the first manifold 600 may be engaged with and substantially shrouded by said first depression 352.

The second shroud 360 may be engaged with the second support member 340 to define a second cavity 341 therebetween. The second shroud 360 may be engaged to the second connector plate 344, to second edge plate 346, fourth edge plate 348, or to some combination thereof. In some embodiments, the second connector plate 344, the second edge plate 346, the first shroud 360, and the fourth edge plate 348 together form a closed loop around second cavity 341. The second shroud 360 may have a second internal surface 364 and a second external surface 366. The second external surface 366 may define therein a second depression 362. The second depression 362 may be sufficient, in size and shape and depth and otherwise, to substantially shroud the second manifold 600' therein. In some embodiments, the second manifold 600' may be engaged with and substantially shrouded by said second depression 362.

As shown in FIGS. 1-9, and 19a-19e for a vertical orientation in system 100 and in FIGS. 10-11 and 22-29 for a horizontal orientation in system 102, the system 100, 102 may provide an apparatus which permits a manifold 600, 600' and associated components to be mounted to the chassis 510 of a vehicle 500. As shown in FIGS. 1-9 and 19a-19e for a vertical orientation in system 100 and in FIGS. 10-11 and 22-29 for a horizontal orientation in system 102, a manifold 600, 600' is mounted distal from the engine (not shown) of the vehicle 500, outside the engine compartment (not shown) of the vehicle 500, to a frame 300 which is mounted to the chassis 510. The manifold 600, 600' may be engaged with other components, such as without limitation a container 200, or the engine (not shown) by a pipe, flexible conduit, hose (not shown) or other means for conveying CNG. In other embodiments the manifold 600, 600' may be engaged directly to the engine (not shown) of a vehicle 500, inside the engine compartment (not shown) but not directly to the engine (not shown), to the chassis 510, elsewhere in a system 100, 102 mounted to the vehicle 500, or elsewhere on the vehicle 500.

Figure 22:
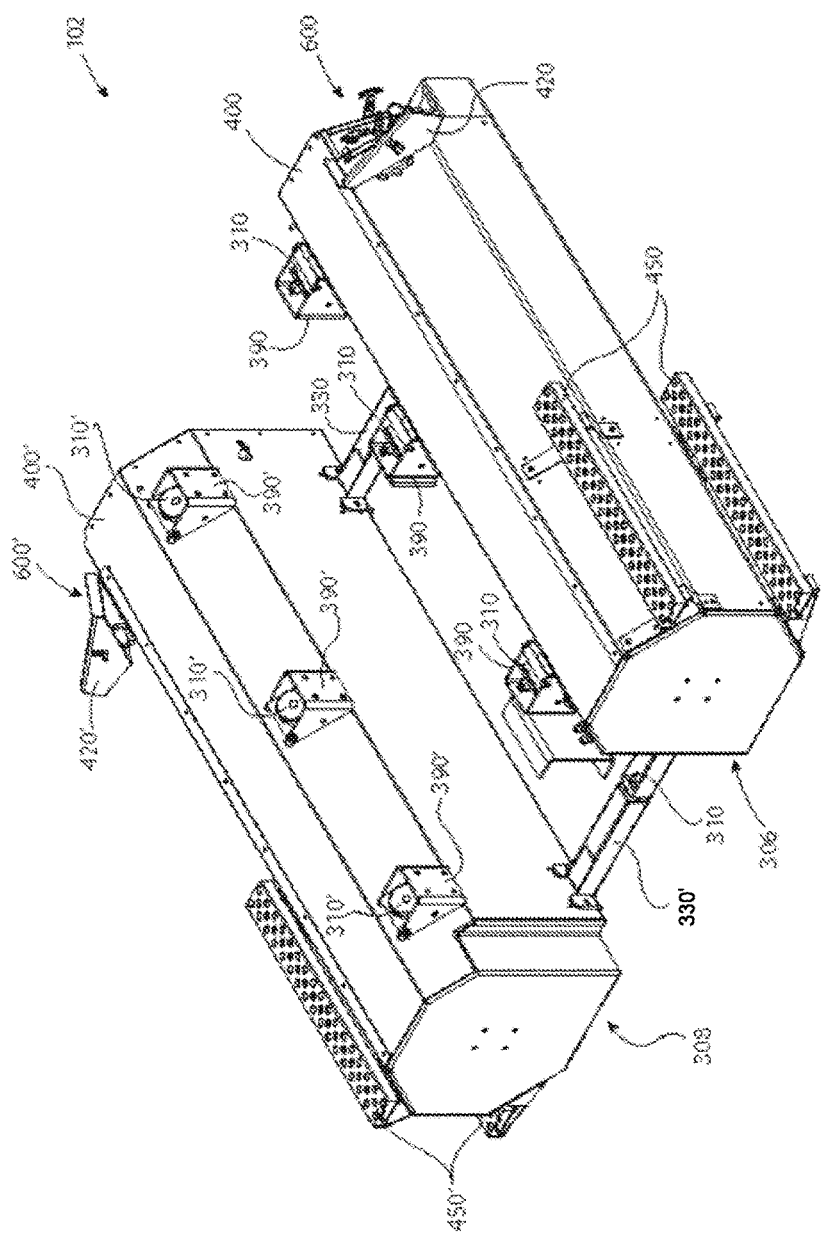
FIG. 22 is an illustration of an embodiment of a system that supports one or more containers in a horizontal orientation.
Figure 23:
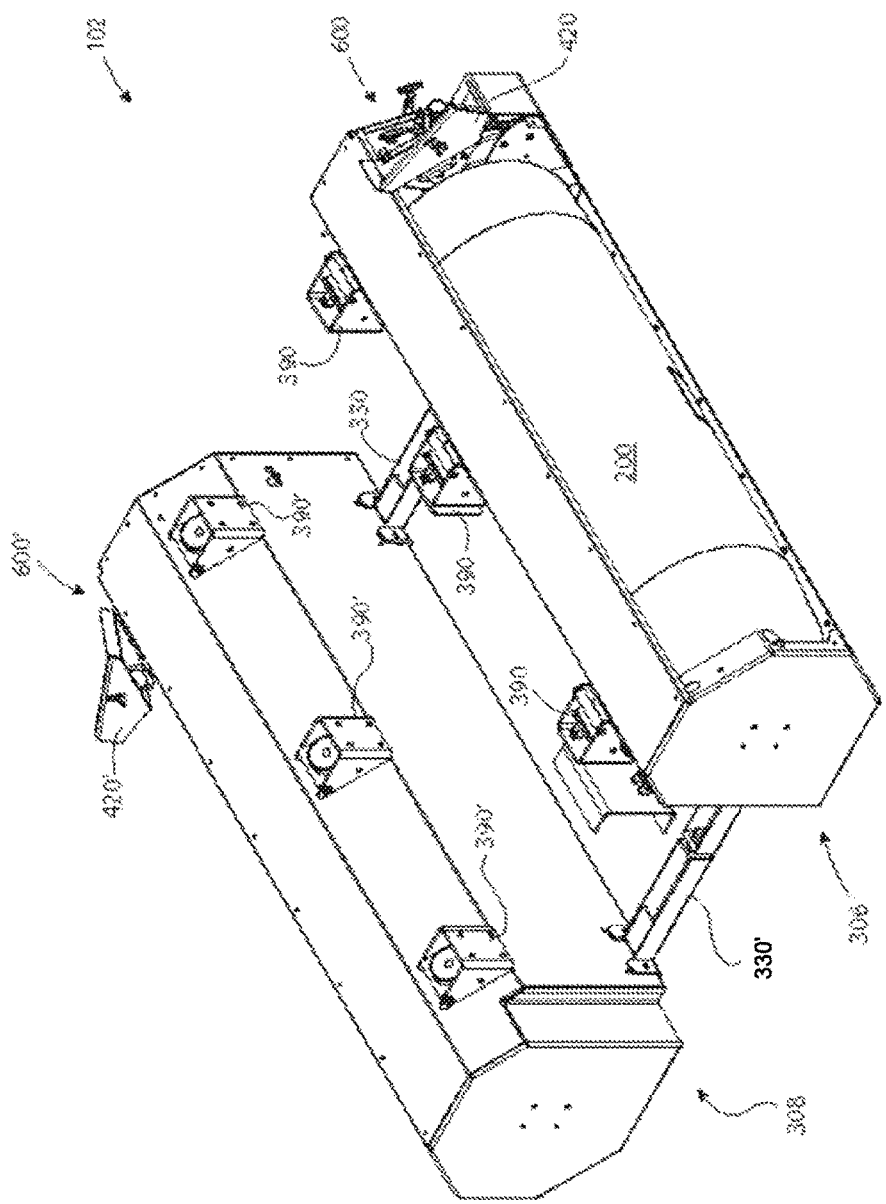
FIG. 23 is an illustration of an embodiment of a system that supports one or more containers in a horizontal orientation.
Figure 24:
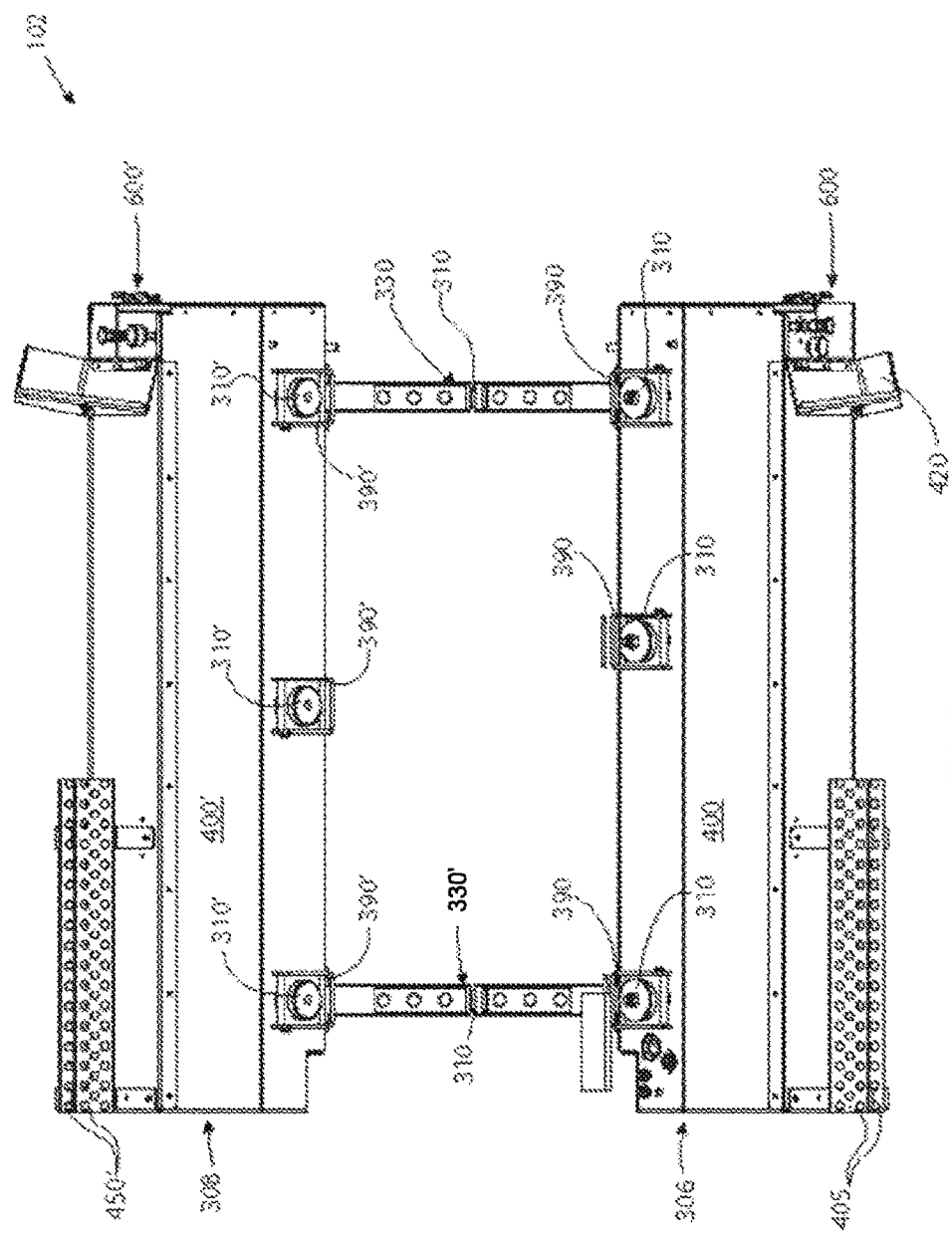
FIG. 24 is an illustration of an embodiment of a system that supports one or more containers in a horizontal orientation.

FIGS. 10-11 and 22-29, system 102 illustrate a non-limiting embodiment of a horizontal compressed natural gas (CNG) system for a vehicle. FIG. 22 is a perspective view of the system 102, FIG. 23 is a perspective view of the system 102 with a portion of the casing 400 removed, FIG. 24 is a top view of the system 102, and FIG. 25 is a bottom view of the system 102. The system 102 can be mounted to a portion of a chassis of the vehicle, wherein the mounting to the portion of the chassis is external and separate from an engine compartment that houses a combustible fuel engine. It is to be appreciated that the system 102 can include elements, features, components, and the like utilized, described or used in connection with the system 100. Thus, one of sound engineering judgment can choose features from the system 100 to include with the system 102 and vice versa without departing from the scope of the subject innovation.

FIGS. 22 and 23 illustrate system 102 that can include a first side 306, a second side 308, and at least one connecting member 330 connecting the first side 306 to the second side 308. FIG. 22 illustrates the system 102 with one or more containers encased (e.g., containers are not shown as the containers are contained within the enclosure), whereas FIG. 23 illustrates the system 102 with one or more containers exposed. It is to be appreciated that the first side 306 can correspond to the driver side 506 of a vehicle and the second side 308 can correspond to the passenger side 508 of the vehicle. The first side 306 can include a length that is between a first end and an opposing second end. Additionally, the second side 308 can include a length that is between a first end and an opposing second end. Although depicted in as a semi-octagon shape, the first side 306 and the second side 308 can be any suitable shape or size that can house container (shown in FIG. 23). For instance, the first side 306 and the second side 308 can be a shape that corresponds with a shape of a container that is housed therewith. In an embodiment, the shape of the first side or the second side can be a polyhedron, a prism, a cylinder, or shape with a volume.

The first side 306 and the second side 308 can be secured to one another by at least connecting member 330 (wherein a front connecting member is referred to as second connecting member 330' and a rear connecting member is referred to as first connecting member 330). In a non-limiting embodiment, the system 102 is illustrated with a first connecting member 330 and a second connecting member 330'. The first connecting member 330 and the second connecting member 330' can respectively include at least one shock mount 310, wherein the shock mount 310 can be, but is not limited to being, a elastomeric damper, a spring-damper, and the like. The at least one connecting member 330 can further include a first member and a second member that are coupled together via a respective shock mount 310 (as illustrated in FIG. 25 which illustrates the system 102 from a bottom view). In a particular non-limiting embodiment and illustrated in FIGS. 25, 28, and 29, a first connecting member 330 (also referred to as rear connecting member 330) can include a first member 1001 and a second member 1002 physically coupled together via shock mount 1003, whereas a second connecting member 330' (also referred to as front connecting member 330') can include a first member 1004 and a second member 1005 physically coupled together via shock mount 1006.

The first side 306 can include casing 400 that encloses and protects at least one container 200. The casing 400 can be any suitable material such as, but not limited to, metal, aluminum, fiberglass, tin, a polymer, a synthetic material, a plastic, and the like. One of sound engineering judgment can select a type of material for casing 400 without departing from the scope of the subject innovation. The first side 306 further includes a manifold 600 that is protected and/or accessed via an access door 420. The manifold 600 is illustrated in more detail in FIGS. 12-18. The first side 306 can further include at least one shock mount 310, wherein the shock mount 310 can be, but is not limited to, a spring-damper, elastomeric damper, among others. At least one mounting bracket 390 is coupled to the first side 306, wherein the mounting bracket 390 physically couples the first side 306 to a portion of a chassis of a vehicle. In an embodiment, the chassis of the vehicle includes a driver side structure and a passenger side structure to which at least one mounting bracket 390 physically couples to the driver side structure. It is to be appreciated that each mounting bracket 390 can include a respective shock mount 310. However, in an embodiment, a mounting bracket 390 may not include a respective shock mount 310. For instance, a first side 306 can include two (2) mounting blocks 390 and four (4) shock mounts 310 and a second side 308 can include two (2) mounting blocks 390 and four (4) shock mounts, wherein each mounting block 390 can include two shock mounts (each having two dampers, bolts, washers, and nuts). In a non-limiting embodiment, the first side 306 is illustrated with a first shock mount included with a first mounting block, a second shock mount included with a second mounting block, and a third shock mount included with a third mounting block. The first side 306 can further include one or more step structures 450 that facilitate entering or exiting a vehicle.

The second side 308 can include casing 400' that encloses and protects at least one container 200. The casing 400' can be any suitable material such as, but not limited to, metal, aluminum, fiberglass, tin, a polymer, a synthetic material, a plastic, and the like. One of sound engineering judgment can select a type of material for casing 400' without departing from the scope of the subject innovation. The second side 308 further includes a manifold 600' that is protected and/or accessed via an access door 420'. The manifold 600' is illustrated in more detail in FIGS. 12-18. The second side 308 can further include at least one shock mount 310', wherein the shock mount 310' can be, but is not limited to, a spring-damper, elastomeric damper, among others. At least one mounting bracket 390' is coupled to the second side 308, wherein the mounting bracket 390' physically couples the second side 308 to a portion of a chassis of a vehicle. In an embodiment, the chassis of the vehicle includes a driver side structure and a passenger side structure to which at least one mounting bracket 390' physically couples to the passenger side structure. It is to be appreciated that each mounting bracket 390' can include a respective shock mount 310'. However, in an embodiment, a mounting bracket 390' may not include a respective shock mount 310'. For instance, a first side 306 can include two (2) mounting blocks 390 and four (4) shock mounts 310 and a second side 308 can include two (2) mounting blocks 390 and four (4) shock mounts, wherein each mounting block 390 can include two shock mounts (each having two dampers, bolts, washers, and nuts). In a non-limiting embodiment, the second side 308 is illustrated with a fourth shock mount included with a fourth mounting block, a fifth shock mount included with a fifth mounting block, and a sixth shock mount included with a sixth mounting block. The second side 308 can further include one or more step structures 450' that facilitate entering or exiting a vehicle.

Figure 26A:
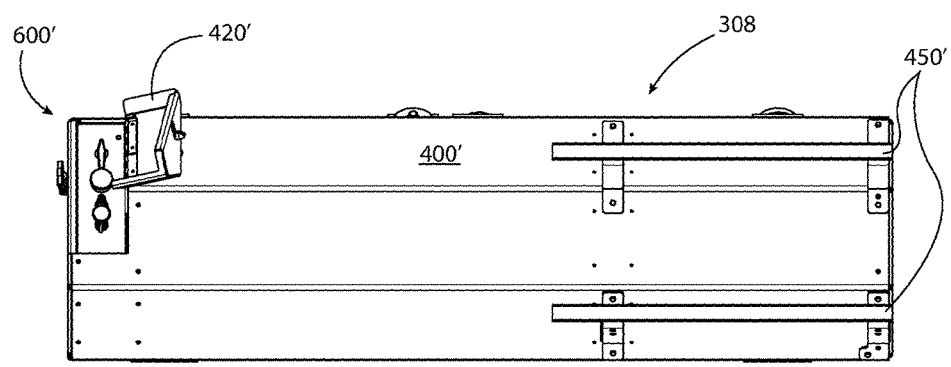
FIG. 26A is an illustration of an embodiment of a system that supports one or more containers in a horizontal orientation.
Figure 26B:
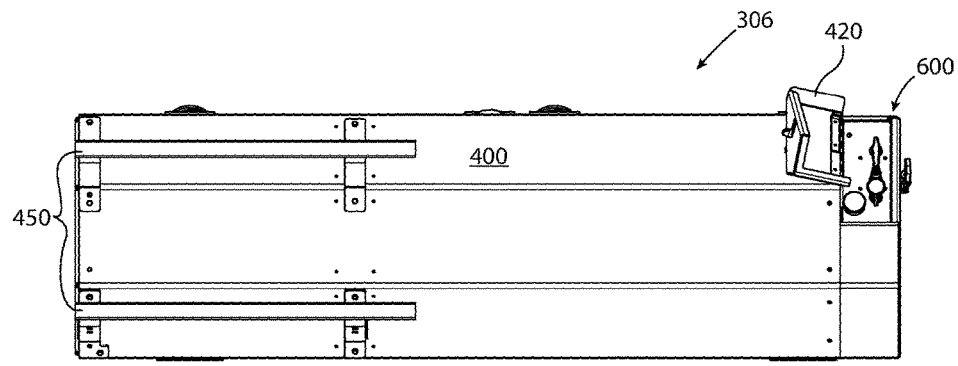
FIG. 26B is an illustration of an embodiment of a system that supports one or more containers in a horizontal orientation.
Figure 27A:
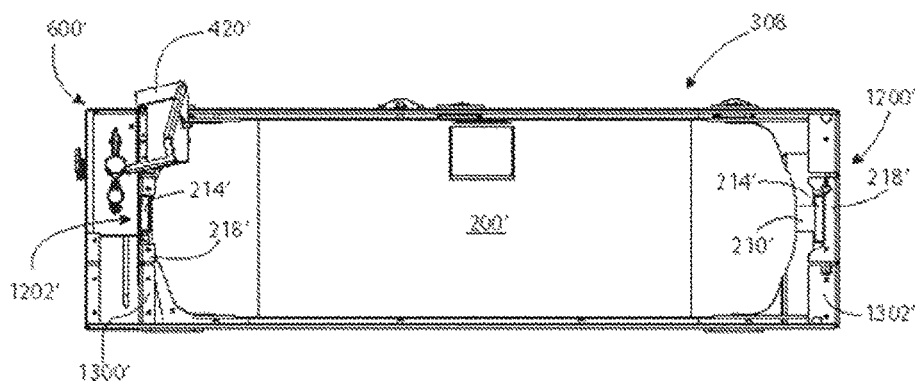
FIG. 27A is an illustration of an embodiment of a system that supports one or more containers in a horizontal orientation.
Figure 27B:
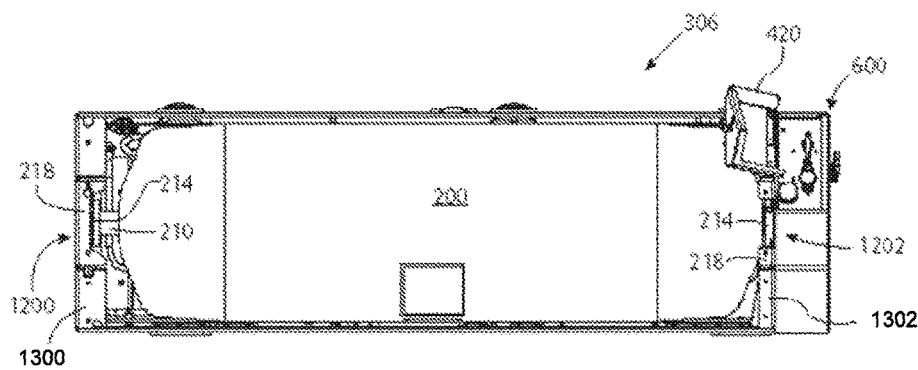
FIG. 27B is an illustration of an embodiment of a system that supports one or more containers in a horizontal orientation.
Figure 28:
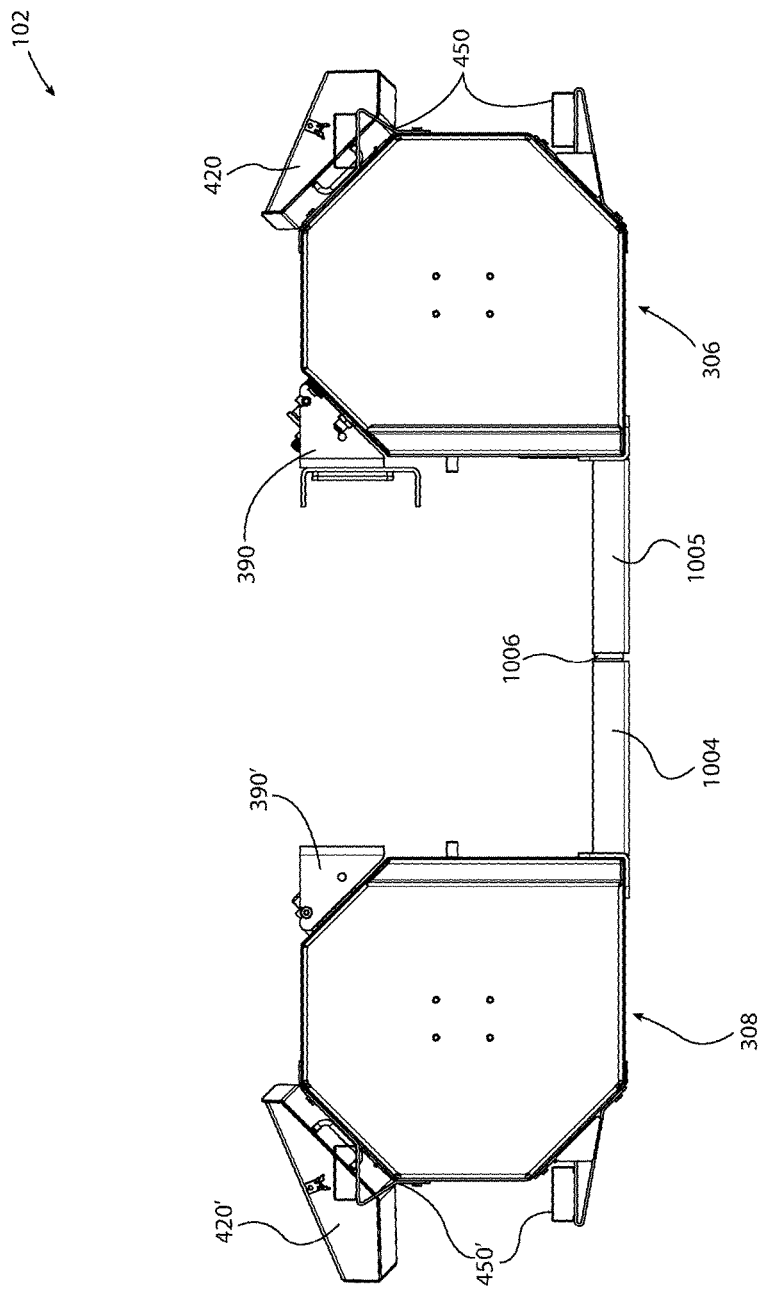
FIG. 28 is an illustration of an embodiment of a system that supports one or more containers in a horizontal orientation.
Figure 29:
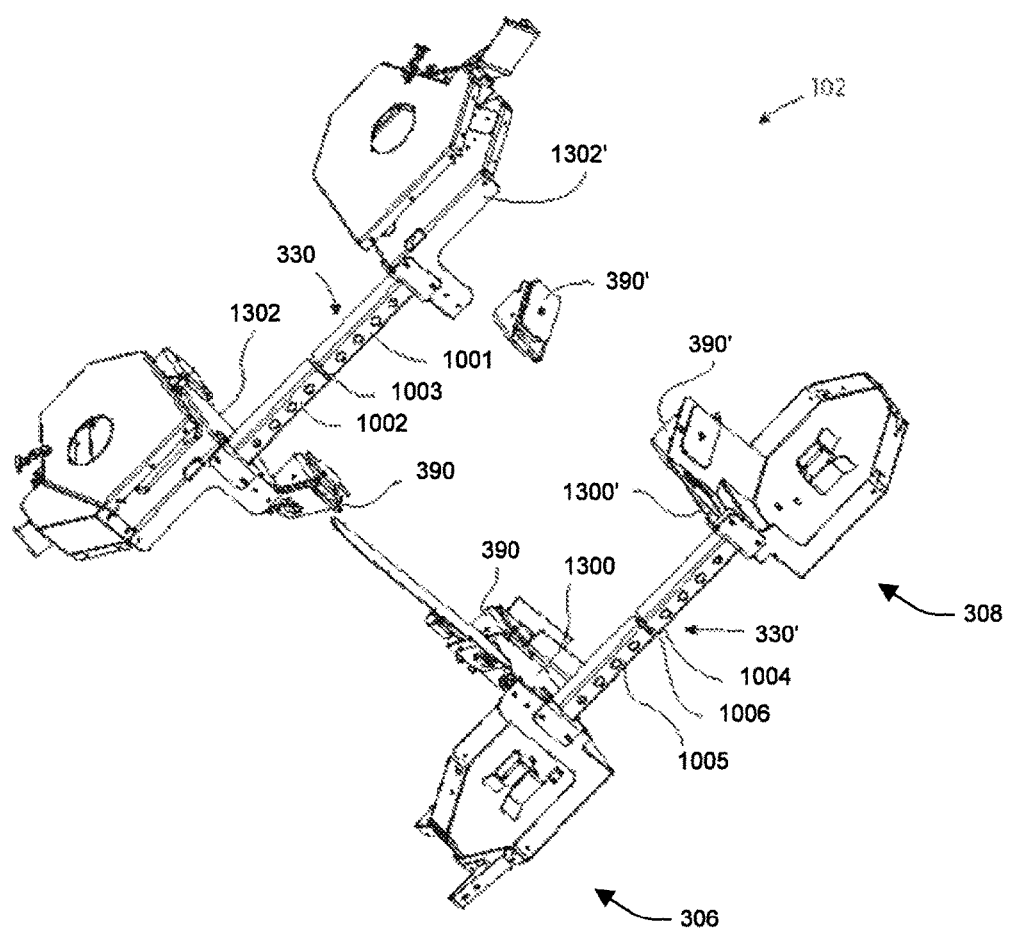
FIG. 29 is an illustration of an embodiment of a system that supports one or more containers in a horizontal orientation.

FIGS. 26a and 26b illustrate the first side 306 and the second side 308 respectively from a side view. FIGS. 27a and 27b illustrate the first side 306 and the second side 308 respectively from a side view with a portion of the casing 400 and 400' removed. FIG. 28 illustrates a front view of the system 102. FIG. 29 illustrates an exploded view that depicts the first side 206 and the second side 208 of the system 102 and the components, members, and elements that allow physical connectivity and coupling to a vehicle.

FIGS. 23, 26b, 27b, and 29 illustrate securing or physically coupling at least one container 200 into the front side 306 for housing. As depicted, the container 200 can be housed in the first side 306 and secured within by one or more neck mounts as described above. In a particular non-limiting embodiment, the first side 306 can include a first neck mount 1200 on a first end of the container 200 and a second neck mount 1202 on a second end of the container 200. The first neck mount 1200 and the second neck mount 1202 can include a respective mount block 214, an internal geometry 215, and an external geometry 216, and a block receiver 218. One of sound engineering judgment can choose a technique on physically coupling a container 200 to the first side 306 and in particular coupling each end of the container 200 to an end of the first side 306 without departing from the scope of the subject innovation.

The neck mounts 1200 and 1202 can be physically coupled to a first support 1300 and a second support 1302 that is opposite of the first support 1300. The first support 1300 can be physically coupled to the connecting member 330'. In particular, the first support 1300 can be physically coupled to the second member 1005. The second support 1302 can be physically coupled to the connecting member 330. In particular, the second support 1302 can be physically coupled to the second member 1002.

By way of example and not limitation, the first support 1300 can be aligned with a first end of container 200 and the second support 1302 can be aligned with a second end of the container 200, where the first end is opposite the second end. In particular, a respective mounting bracket 390 and shock mount 310 can be coupled to the first support 1300. Additionally, a respective mounting bracket 390 and shock mount 310 can be coupled to the second support 1302. In a particular embodiment, an additional mounting bracket 390 and shock mount 310 can be coupled to the casing 400 at a location in between the first support 1300 and the second support 1302.

FIGS. 23, 26a, 27a, and 29 illustrate securing or physically coupling at least one container 200' into the side 308 for housing. As depicted, the container 200' can be housed in the second side 308 and secured within by one or more neck mounts as described above. In a particular non-limiting embodiment, the second side 308 can include a first neck mount 1200' on a first end of the container 200' and a second neck mount 1202' on a second end of the container 200'. The first neck mount 1200' and the second neck mount 1202' can include a respective mount block 214', an internal geometry 215', and an external geometry 216', and a block receiver 218'. One of sound engineering judgment can choose a technique on physically coupling a container 200' to the second side 308 and in particular coupling each end of the container 200' to an end of the second side 308 without departing from the scope of the subject innovation.

The neck mounts 1200' and 1202' can be physically coupled to a first support 1300' and a second support 1302' that is opposite of the first support 1300'. The first support 1300' can be physically coupled to the connecting member 330'. In particular, the first support 1300' can be physically coupled to the first member 1004. The second support 1302' can be physically coupled to the connecting member 330. In particular, the second support 1302' can be physically coupled to the first member 1001.

By way of example and not limitation, the first support 1300' can be aligned with a first end of container 200' and the second support 1302' can be aligned with a second end of the container 200', where the first end is opposite the second end. In particular, a respective mounting bracket 390 and shock mount 310' can be coupled to the first support 1300'. Additionally, a respective mounting bracket 390' and shock mount 310' can be coupled to the second support 1302'. In a particular embodiment, an additional mounting bracket 390' and shock mount 310' can be coupled to the casing 400' at a location in between the first support 1300' and the second support 1302'.

It is to be appreciated, as discussed above, that the system 100 or 102 can include one or more containers. In a non-limiting embodiment a first container and a second container is illustrated. In another embodiment, the system 100 or 102 can include the first side 306 and the second side 308, wherein the first side 306 houses a first container 200 and the second side 308 houses a weight element (e.g., counterweight, a automatically controlled and adjusted weight element, a counterbalance element, among others) to balance the system 100 or 102 coupled to the chassis or frame of the vehicle. It is to be appreciated that the weight element size, shape, weight, and other characteristics can be chosen with sound engineering judgment and are intended to be within the scope of the subject innovation.

It is to be appreciated that the first side 306 and the second side 308 can be a frame for the system 102 that supports one or more containers 200 in a horizontal configuration such that the containers are horizontal in comparison to a surface the vehicle is traveling and/or one or more axles of the vehicle. By way of example and not limitation, the frame for the system 102 can include at least one of the first side 306, the second side 308, the connecting member 330, the casing 400, the shock mount 310, the mounting bracket 390, the support member 1300 and the support member 1302.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A fuel delivery system intended to deliver fuel to a vehicle engine of a vehicle having a cabin, comprising:
    a first container having a cylindrical shape with a length, a diameter, and a first end opposite a second end in which the first end includes a first valve opening;
    a second container having a cylindrical shape with a length, a diameter, and a first end opposite a second end in which the first end includes a second valve opening;
    a conduit for a gas flow between at least two of the first container, the second container, the first valve opening, the second valve opening, and the vehicle engine;
    a frame that defines an interior space, the frame supports the first container and the second container within the defined interior space;
    the frame is engaged to a chassis of the vehicle at a location on the chassis such that the first container and the second container are located rearward of the cabin of the vehicle;
    the frame shrouds a manifold engaged to the frame within the defined interior space; and
    an access door that is configured to be opened or closed to gain access to the manifold.

2. The fuel delivery system of claim 1, further comprising a manifold engaged to the frame within the defined interior space, the manifold is in fluid communication via the conduit with at least one of the vehicle engine, the first valve opening, the second valve opening, the first container, or the second container.

3. The fuel delivery system of claim 2, further comprising a coalescing filter that couples into the manifold.

4. The fuel delivery system of claim 1, the vehicle engine is a combustible fuel engine that consumes at least one of a gasoline fuel or a diesel fuel and is further configured to consume a compressed gas housed in the first container or the additional container.

5. The fuel delivery system of claim 1, further comprising a casing that surrounds the frame, the casing includes hinges to allow access to the first valve opening or the second valve opening inside the defined interior space of the frame.

6. The fuel delivery system of claim 1, the frame shrouds at least one of a portion of the first container or a portion of the second container.

7. The fuel delivery system of claim 1, the first container is proximate to a driver side of the vehicle within the defined interior space of the frame and the second container is proximate to a passenger side of the vehicle within the defined interior space of the frame.

8. The fuel delivery system of claim 7, further comprising an additional container within the interior space of the frame and in between the first container and the second container, wherein the additional container has a cylindrical shape with a length, a diameter, and a first end opposite a second end in which the first end includes a valve opening.

9. The fuel delivery system of claim 1, wherein the manifold includes a fill port in fluid communication with at least one of the first container or the second container and is configured to receive a rate of flow.

10. The fuel delivery system of claim 9, the manifold further includes a fast-fill port in fluid communication with at least one of the first container or the second container, wherein the fast-fill port is configured to receive a first rate of flow, wherein the first rate of flow is greater than the rate of flow.

11. The fuel delivery system of claim 1, the manifold further includes a fuel transfer port in fluid communication with at least one of the first container or the second container, wherein the fuel transfer port is adapted to allow fluid transfer between at least one of the first container and the second container and an additional container separate of the vehicle.

12. A fuel delivery system intended to deliver fuel to a vehicle engine of a vehicle having a cabin, comprising:
    a first container having a cylindrical shape with a length, a diameter, and a first end opposite a second end in which the first end includes a first valve opening;
    a second container having a cylindrical shape with a length, a diameter, and a first end opposite a second end in which the first end includes a second valve opening;
    a conduit for a gas flow between at least two of the first container, the second container, the first valve opening, the second valve opening, and the vehicle engine;
    a frame that defines an interior space, the frame supports the first container and the second container within the defined interior space;
    a portion of the frame shrouds a manifold engaged to the frame within the defined interior space;
    an access door that is configured to be opened or closed to gain access to the manifold; and
    the frame is at least one of the following:
        engaged to a chassis of the vehicle at a location on the chassis such that the first container and the second container are located rearward of the cabin of the vehicle, wherein the first container and the second container are positioned substantially vertical in comparison the chassis of the vehicle; and engaged to a chassis of the vehicle at a location on the chassis such that the first container and the additional container are in a horizontal plane that is located below the cabin of the vehicle, wherein first container and the additional container are positioned substantially horizontal in comparison the chassis of the vehicle.

13. The fuel delivery system of claim 12, further comprising a manifold engaged to the frame within the defined interior space, the manifold is in fluid communication via the conduit with at least one of the vehicle engine, the first valve opening, the second valve opening, the first container, or the second container.

14. The fuel delivery system of claim 12, further comprising a coalescing filter that couples into the manifold.

15. The fuel delivery system of claim 12, the vehicle engine is a combustible fuel engine that consumes at least one of a gasoline fuel or a diesel fuel and is further configured to consume a compressed gas housed in the first container or the additional container.

16. The fuel delivery system of claim 12, further comprising a casing that surrounds the frame, the casing includes hinges to allow access to the first valve opening or the second valve opening inside the defined interior space of the frame.

17. The fuel delivery system of claim 12, the frame shrouds at least one of a portion of the first container or a portion of the second container.

18. The fuel delivery system of claim 12, the first container is proximate to a driver side of the vehicle within the defined interior space of the frame and the second container is proximate to a passenger side of the vehicle within the defined interior space of the frame.

19. The fuel delivery system of claim 18, further comprising an additional container within the interior space of the frame and in between the first container and the second container, wherein the additional container has a cylindrical shape with a length, a diameter, and a first end opposite a second end in which the first end includes a valve opening.

20. The fuel delivery system of claim 12, the manifold further includes at least one of the following:

a fill port in fluid communication with at least one of the first container or the second container and is configured to receive a rate of flow;

a fast-fill port in fluid communication with at least one of the first container or the second container, wherein the fast-fill port is configured to receive a first rate of flow, wherein the first rate of flow is greater than the rate of flow; and a fuel transfer port in fluid communication with at least one of the first container or the second container, wherein the fuel transfer port is adapted to allow fluid transfer between at least one of the first container and the second container and an additional container separate of the vehicle.

\* \* \* \* \*